(12) United States Patent
Bradlee

(10) Patent No.: US 10,556,840 B1
(45) Date of Patent: Feb. 11, 2020

(54) EARTH APPLIANCE AERATED COMPOSTER UNIT

(71) Applicant: Michael James Bradlee, Providence, RI (US)

(72) Inventor: Michael James Bradlee, Providence, RI (US)

(*) Notice: Subject to any disclaimer, the term of this patent is extended or adjusted under 35 U.S.C. 154(b) by 96 days.

(21) Appl. No.: 15/730,018

(22) Filed: Oct. 11, 2017

Related U.S. Application Data

(60) Provisional application No. 62/406,894, filed on Oct. 11, 2016.

(51) Int. Cl.
| | |
|---|---|
| *C05F 17/02* | (2006.01) |
| *B65F 1/08* | (2006.01) |
| *B65F 1/16* | (2006.01) |
| *C05F 9/02* | (2006.01) |
| *B65F 1/14* | (2006.01) |

(52) U.S. Cl.
CPC .......... *C05F 17/0288* (2013.01); *B65F 1/085* (2013.01); *B65F 1/16* (2013.01); *C05F 9/02* (2013.01); *C05F 17/0205* (2013.01); *C05F 17/0211* (2013.01); *C05F 17/0258* (2013.01); *C05F 17/0276* (2013.01); *B65F 2001/1489* (2013.01); *B65F 2210/13* (2013.01); *B65F 2210/181* (2013.01)

(58) Field of Classification Search
CPC .............. C05F 17/0288; C05F 17/0276; C05F 17/0211; C05F 17/0205; C05F 9/02; B65F 1/16; B65F 1/085; B65F 2210/13; B65F 2210/181; B65F 2001/1489
USPC ............................................ 435/290.1–290.4
See application file for complete search history.

(56) References Cited

U.S. PATENT DOCUMENTS

| | | | |
|---|---|---|---|
| 5,118,005 A * | 6/1992 | Onodera ................. | B65F 1/004 220/501 |
| 5,165,564 A * | 11/1992 | Prout .................... | B65F 1/1468 220/229 |

* cited by examiner

*Primary Examiner* — Michael L Hobbs
(74) *Attorney, Agent, or Firm* — Keeley DeAngelo LLP; W Scott Keeley

(57) ABSTRACT

In accordance with example embodiments of the present disclosure, the invention provides a combination waste collection container and aerated composter for general composting and waste collection and more specifically to aerated composting and organic waste collodion. The utility of the invention can be extended to the complementary food scrap processing method known as anaerobic digestion, through specific modifications.

17 Claims, 26 Drawing Sheets

EARTH APPLIANCE AERATED COMPOSTER UNIT

TECHNICAL FIELD

The present disclosure relates generally to composting and waste collection and more specifically to an aerated composter and organic waste collection bin.

BACKGROUND

Composting has many benefits to the environment. Compost is a key ingredient in organic and natural farming practices. At its most essential, the process of composting requires simply piling up organic waste such as food scraps and leaf and brush waste outdoors and waiting a year or more.

Modern, methodical composting is a multi-step, closely monitored process with measured inputs of water, air and carbon- and nitrogen-rich materials. The decomposition process is aided by shredding the plant matter, adding water and ensuring proper aeration by regularly turning the mixture. Aerobic bacteria manage the chemical process by converting the inputs into heat, carbon dioxide and ammonium. The ammonium is further converted by bacteria into plant-nourishing nitrates. Worms and fungi further break up the fibrous material that continues to support other organisms and helps to retain mineral components.

Compost can be rich in nutrients. It is used in gardens, landscaping, horticulture, and agriculture. The compost itself is beneficial for the land in many ways, including as a soil conditioner, a fertilizer, by addition of vital humus or humic acids, and as a natural pesticide for certain parasitic organisms in the soil and among the foliage.

In ecosystems, compost is useful for erosion control, land and stream reclamation, wetland construction, and as landfill cover (see compost uses). Food scraps can also be used to generate biogas through anaerobic digestion, a complement to aerobic composting.

In closely packed, commercial or residential settings, however, composting can become problematical. Specifically, the matter that is decaying into compost can emanate offensive or strong odors even when managed with best practices.

Therefore, there is a perceived need in the art to create a compost bin that minimizes odors of composting material, thus making the system desirable in suburban and urban settings.

SUMMARY

The present embodiment relates to composting and waste collection and more specification to an aerated composter and organic waste collection bin. The design is adaptable to function as an anaerobic digester. The unit has inlets and outlets that are adaptable to anaerobic specifications.

The present embodiment is a compost bin that includes an aeration device comprised of a hollow base and a hollow vertical protrusion. The vertical protrusion is otherwise referred to as a gill. In some embodiments, the interior of the hollow base is in fluid communication with the interior of the gill. In one embodiment the interior of the base is separate from the interior of the gill. In another embodiment the base has a flat bottom and a slanted top. In some embodiments the base is perforated or grooved, and in some embodiments the gill is perforated or grooved.

Some embodiments include a forward facing ventilation conduit design that extends from the upper portion of the front of the bin, into the front, bottom section of the bin. One open end of the forward facing ventilation conduit is exposed to the ambient environment, while the opposite end is exposed to the interior of the hollow base. Another conduit extends from the interior of the upper portion of the gill, to a vent in the back of the container. Ambient air may be directed through the conduit and through the perforated base, following through the perforated gill, and thus the composting materials, and out the conduit and vent in the back of the container and allows for thorough air circulation, and aeration of composting materials. The container's unique internal gill is placed strategically in the center of the container and is built from the bottom of the container and tapered to the top of the container to maximize efficient and thorough air exchange.

In some embodiments, the vertical ventilation conduit directs air flow from a forward vent into the perforated, slanted base at the bottom of the container, the air flow rising through the gill to a rearward vent that allows for continuous air flow and frequent air exchange and thus oxygenation of composting materials. Air exchange and oxygenation of composting materials accelerates the composting process and minimizes foul odor associated with anaerobic conditions in stagnant air. The perforated, slanted base and vertical tubing is sized to allow for efficient air exchange while preventing materials from entering the perforations and clogging the ventilation. In other words, the perforated, slanted base in combination with the perforated, vertical gill allows for continuous flow of air through the vent and the entire interior of the container.

The vertical gill also allows for liquids to filter through perforations and fall thus collecting in the bottom of the container.

These bins are designed to be utilized in at a commercial site or setting as well as a residential dwelling. These compost bins are tippable and may be integrated into a waste and recycling management system. These compost bins contain wheels that allow for ease of movement and placement. The vertical upright design results in a small footprint of the unit.

These bins are designed for extending collection and storage for Source-Separated Organics while minimizing odors associated with waste food materials. These compost bins are intended to be utilized at an institution such as a school or hospital, a commercial site, such as a restaurant or university dining hall or a residential dwelling. These compost bins are also designed to allow for accelerated and efficient composting and thus the composting process may be initiated at any time during the collection process. By allowing the option to initiate the composting process at the collection site, material's collection time is lengthened and odor events are minimized and or eliminated. Longer collection windows translates into less frequent tipping and servicing and lower costs associated with waste and recycling management.

One embodiment incorporates portal conduits and vents substantially above ½ the total height of the unit to allow for liquids containment, and to take advantage of the higher air velocity and thus aeration through the bin.

One embodiment incorporates front and rear vent portals offset relative to each other to allow for a differential flow of air across the vents One embodiment incorporates the Gill into a flow-through design, where material enters one end and exits another. The flow may be in a vertical top to bottom fashion. The flow may be in a vertical orientation, where food scrap and fiber material is charged in one end and finished compost is removed from the other end. There may be multiple Gills incorporated into a single unit. In this embodiment the Gill also doubles as a barrier that forces a specified directional flow of composting material through the system.

One embodiment has removable side panels, and allows for separate units to be linked together to create a flow-through design.

Other objects and features will become apparent from the following detailed description considered in conjunction with the accompanying drawings. It is to be understood, however, that the drawings are designed as an illustration and not as a definition of the limits of the invention.

BRIEF DESCRIPTION OF THE DRAWINGS

To assist those of skill in the art in making and using the disclosed combination waste collection container and aerated composter, reference is made to the accompanying figures, wherein.

DETAILED DESCRIPTION OF THE DRAWINGS

Figure 1:
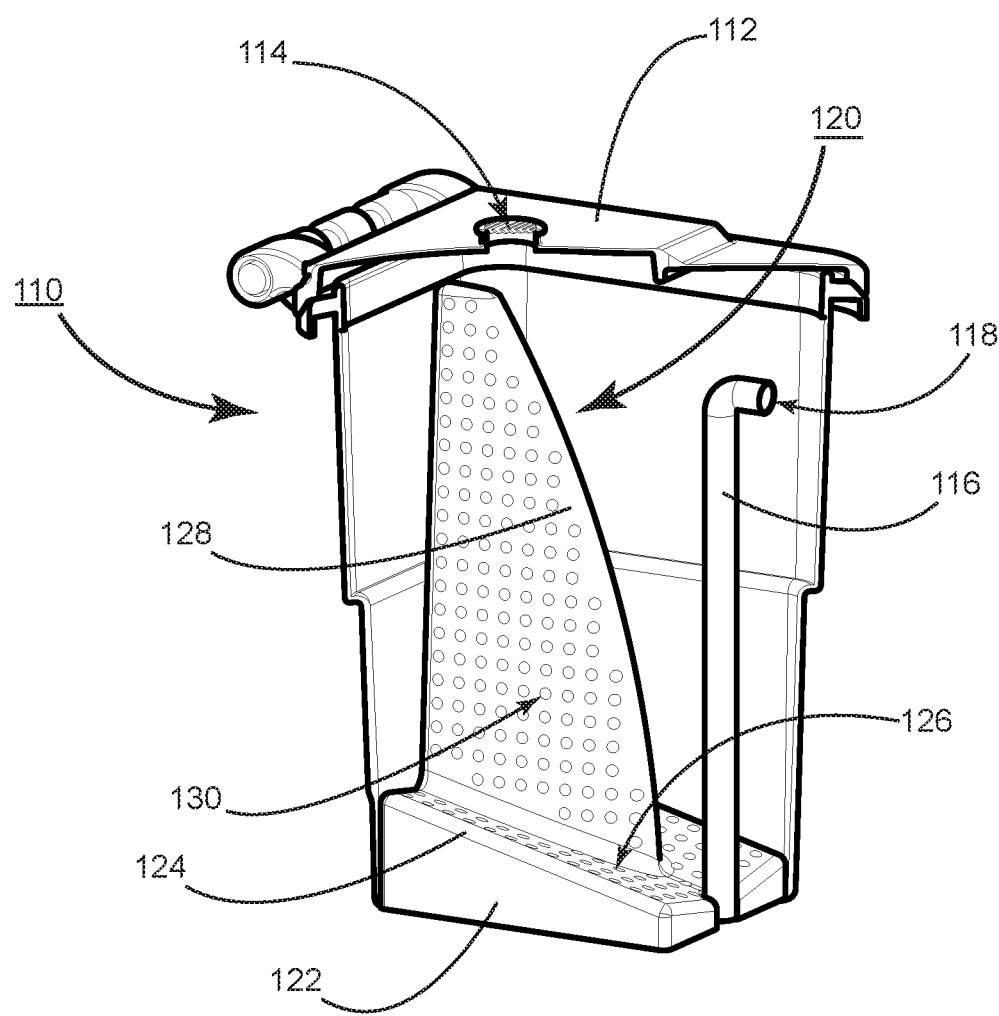
FIG. 1 is a section, perspective view of the earth appliance aerated composter unit.

FIG. 1 is a perspective, section view of the embodiment 100 comprised of a municipal recycling tote 110, a lid 112, an upward vent 114, a conduit 116, a forward vent 118, an aeration device, otherwise known as a gill 120, a base 122, a slanted false bottom 124, base perforations 126, a protrusion 128, and gill perforations 130. Perforations covering the entire gill having fewer perforations near the top holes between ¼" diameter to 5/16 diameter spaced between 5/16 apart and ¾" apart. The gill having a length at the top between 10% and 60% of the inner depth of the municipal recycling tote and having a length at the bottom between 40% and 100% of the inner depth of the a municipal recycling tote.

Figure 2:
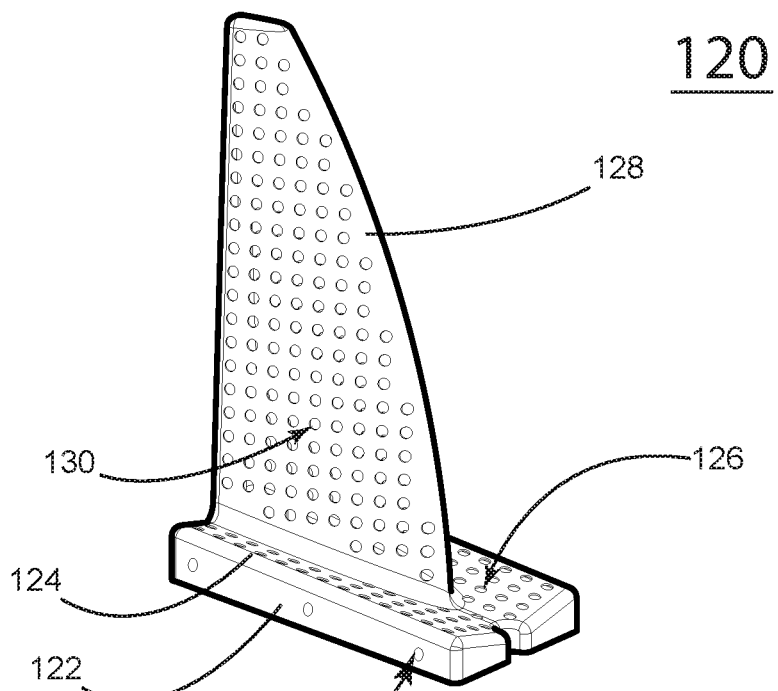
FIGS. 2 and 3 are perspective views of the perforated, hollow, vertical gill and hollow, slanted base.
Figure 3:
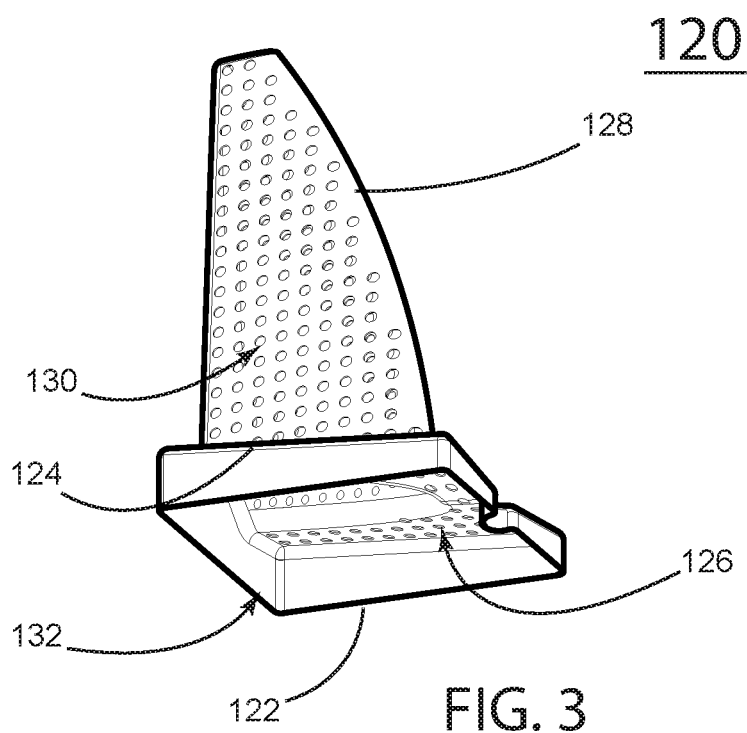

FIGS. 2 and 3 illustrate an example embodiment of a gill 120, comprised of a base 122, hardware connection points 123, a sloped false bottom 124, base perforations 126, a protrusion 128, gill perforations 130, and an open underside 132.

Figure 4:
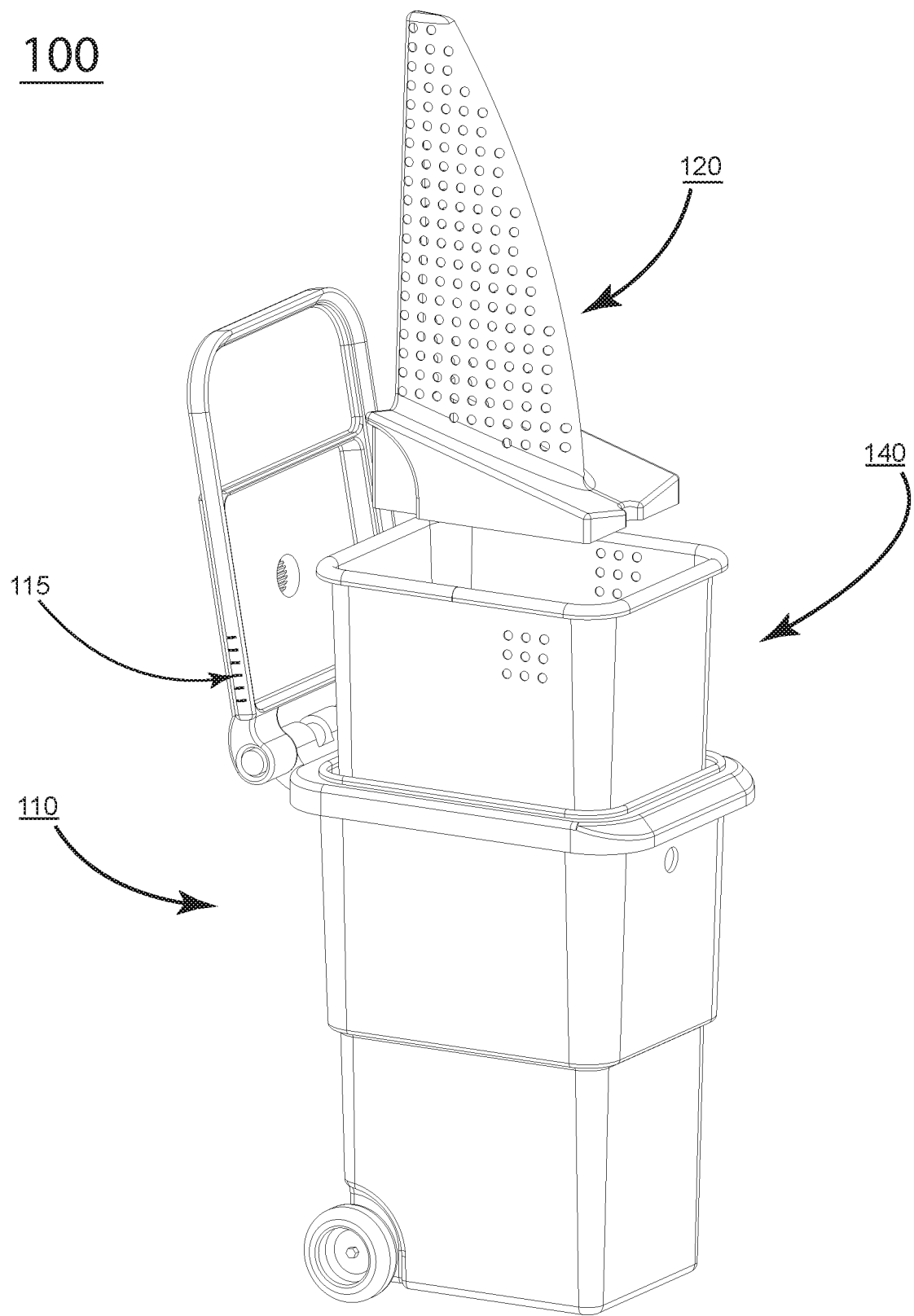
FIG. 4 is a perspective, exploded view of the earth appliance aerated composter unit.

FIG. 4 is a perspective, exploded view of the embodiment 100 comprised of a municipal recycling tote 110, lid side vents 115, and a liner 140.

Figure 5:
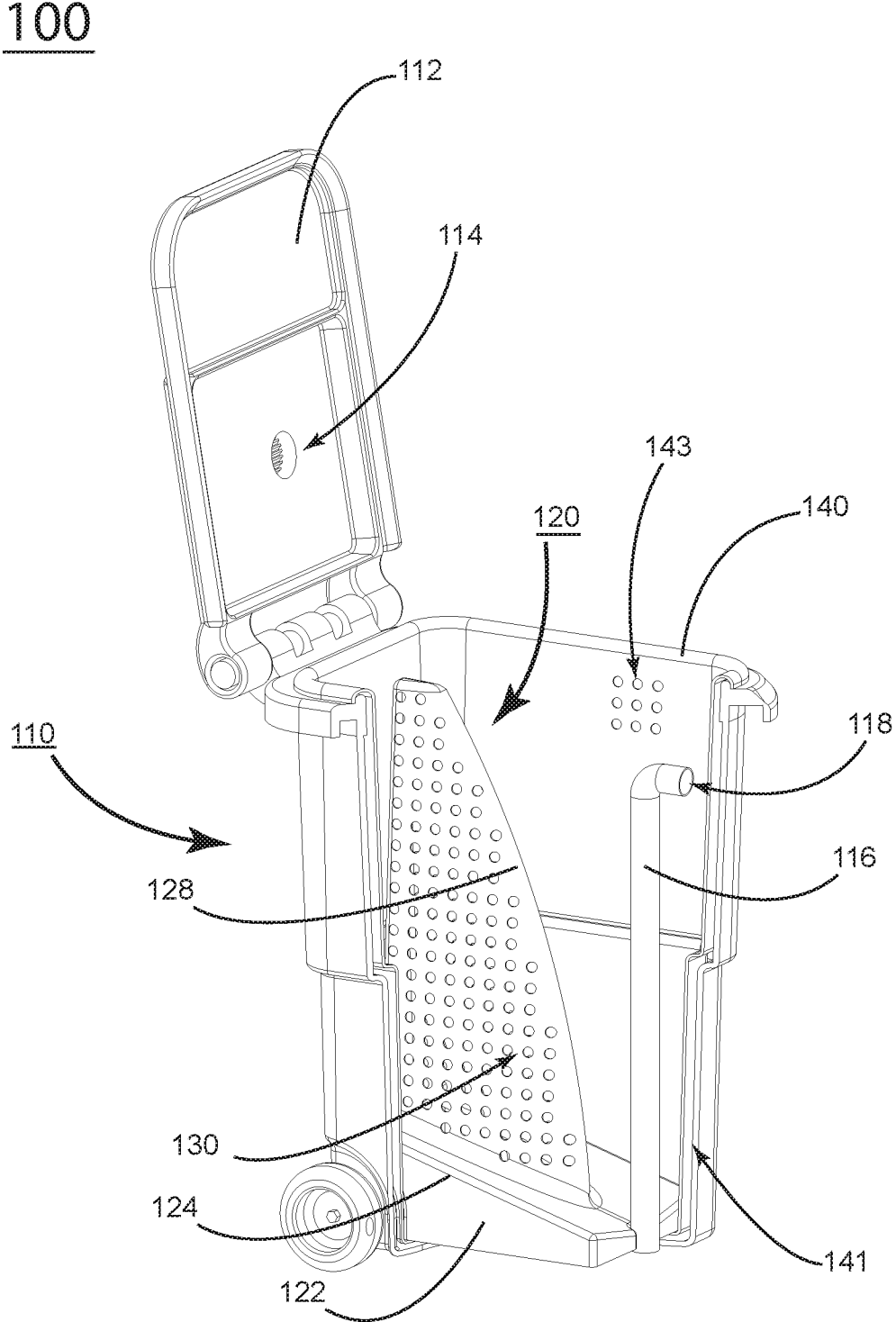
FIG. 5 is a perspective, section view of the earth appliance aerated composter unit.

FIG. 5 is a perspective, section view of the embodiment 100 comprised of a municipal recycling tote 110, a lid 112, an interior liner 140, an upward vent 114, a conduit 116, a forward vent 118, an aeration device, otherwise known as a gill 120, a base 122, a slanted false bottom 124, base perforations 126, a protrusion 128, and gill perforations 130. The liner 140 forms a plenum 141 between the outer surface of the liner 140 and the inner surface of the municipal recycling tote 110. The liner has ventilation holes 143. The plenum 141 provides an insulation layer between the compost material inside the liner and the outside environment. The ventilation holes 143 allow air and moisture to flow from the compost material into the plenum 141 and back through other ventilation holes 143.

Figure 6:
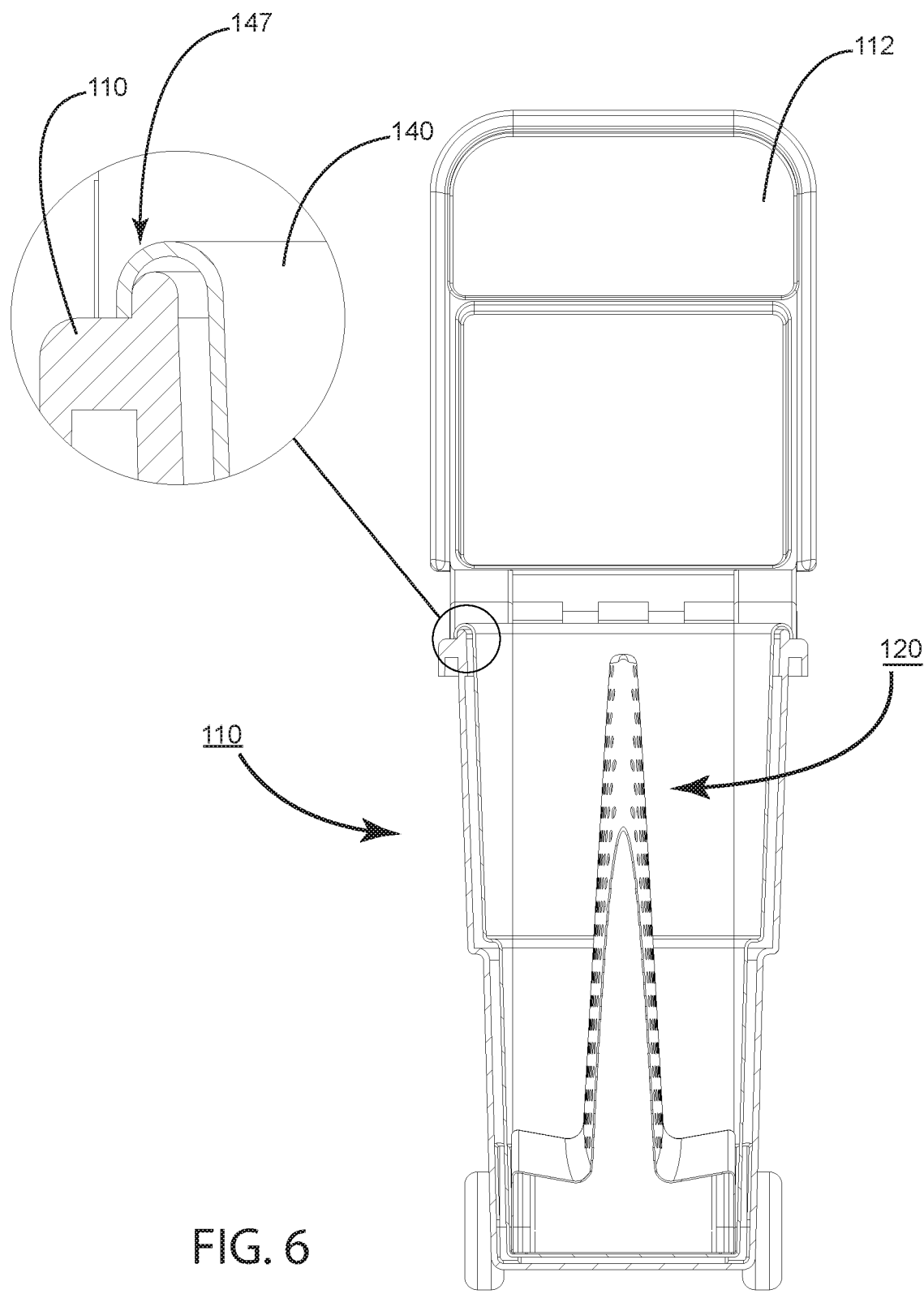
FIG. 6 is an orthographic, section back view of the earth appliance aerated composter unit.

FIG. 6 is an orthographic, detail, section view of the embodiment 100, showing the municipal recycling tote 110 with lid 112 and gill 120. FIG. 6 illustrates a method of engaging the liner 140 with the municipal recycling tote 110. The detail view shows a lip 147 on the liner 140, engaged with the upper edge of the municipal recycling tote 110.

Figure 7:
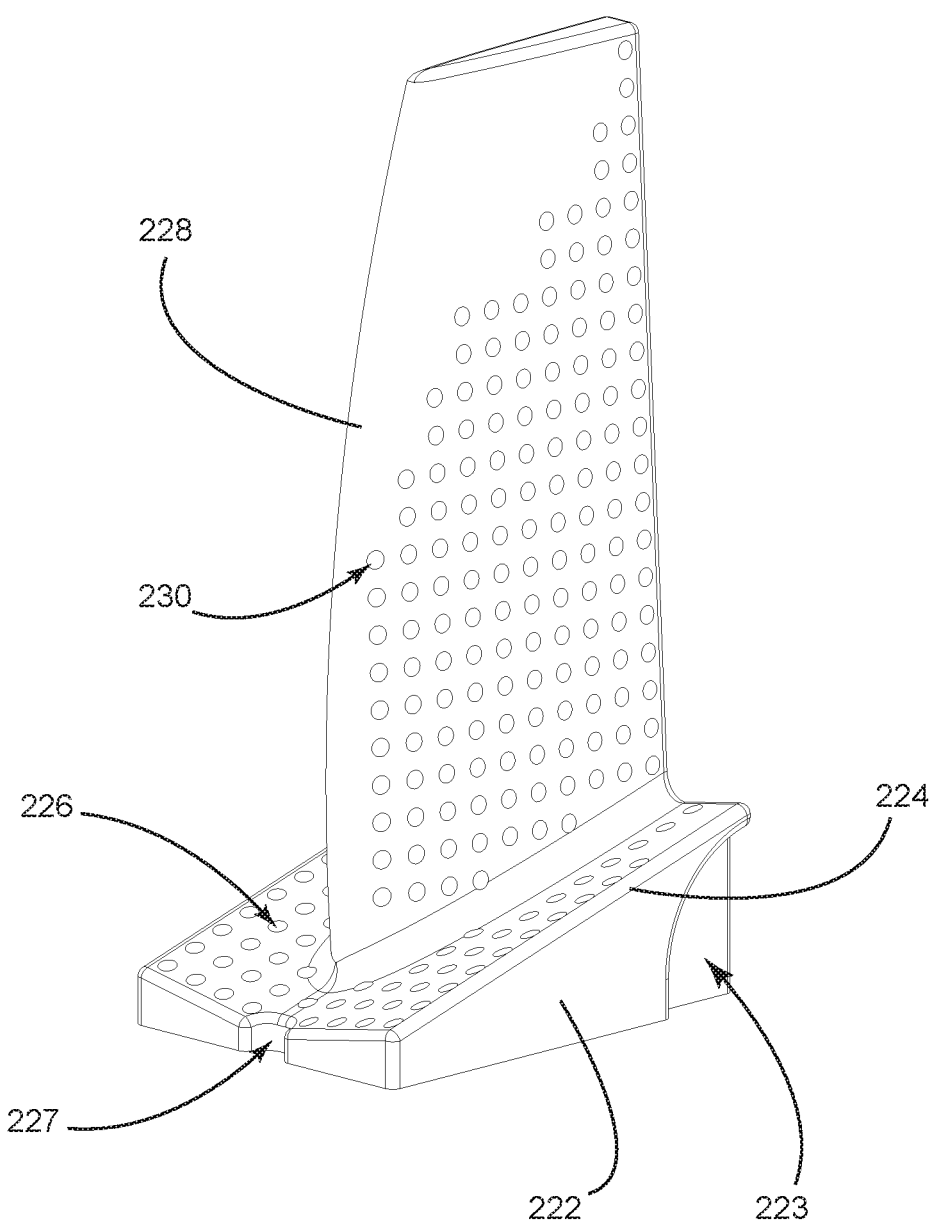
FIG. 7 is a perspective view of one embodiment of a perforated, vertical gill and slanted base.

FIG. 7, in an example embodiment 220, a perforated, vertical gill and horizontal, slanted base comprised of a base 222, an indent 223 for engaging with various interior contours of example municipal recycling totes 110 (FIG. 1), a sloped false bottom 224, base perforations 226, a front base indent 227, a protrusion or gill 228, and gill perforations 230 are shown. In this embodiment, the gill 228 has an upper edge that is between 80% and 90% of the length of the lower edge and the gill 220 has perforations covering between 60% and 80% of the gill surface.

Figure 8:
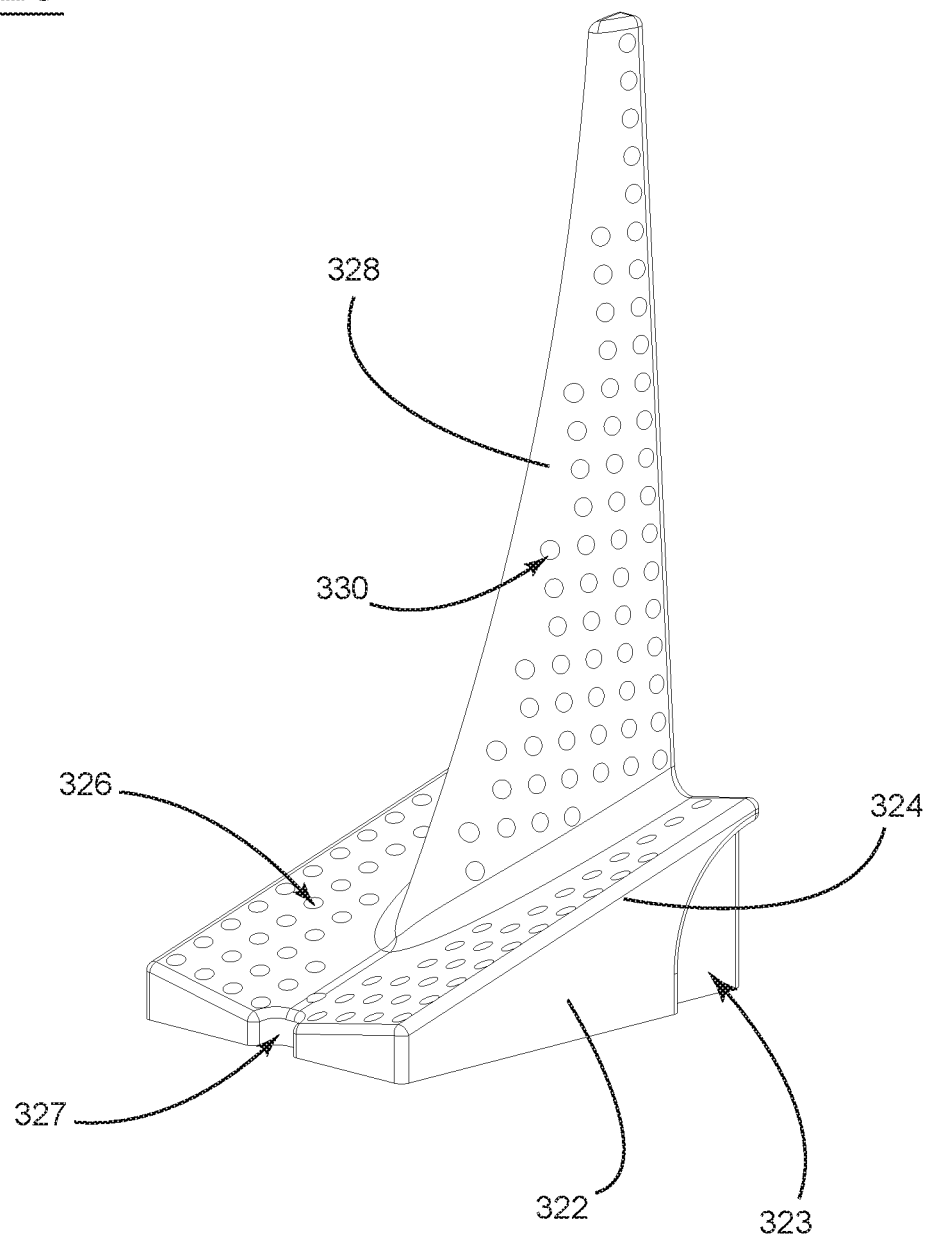
FIG. 8 is a perspective view of another embodiment of a perforated, vertical gill and slanted base.

FIG. 8, in an example embodiment 320, a perforated, vertical gill and horizontal, slanted base comprised of a base 322, a rear base indent 323, a sloped false bottom 324, base perforations 326, a front base indent 327, a protrusion or gill 328, and gill perforations 330 are shown. The embodiment 300 illustrates a gill with an upper edge that is between 10% and 20% the length of the lower edge with perforations covering between 80% and 100% of the gill surface.

Figure 9:
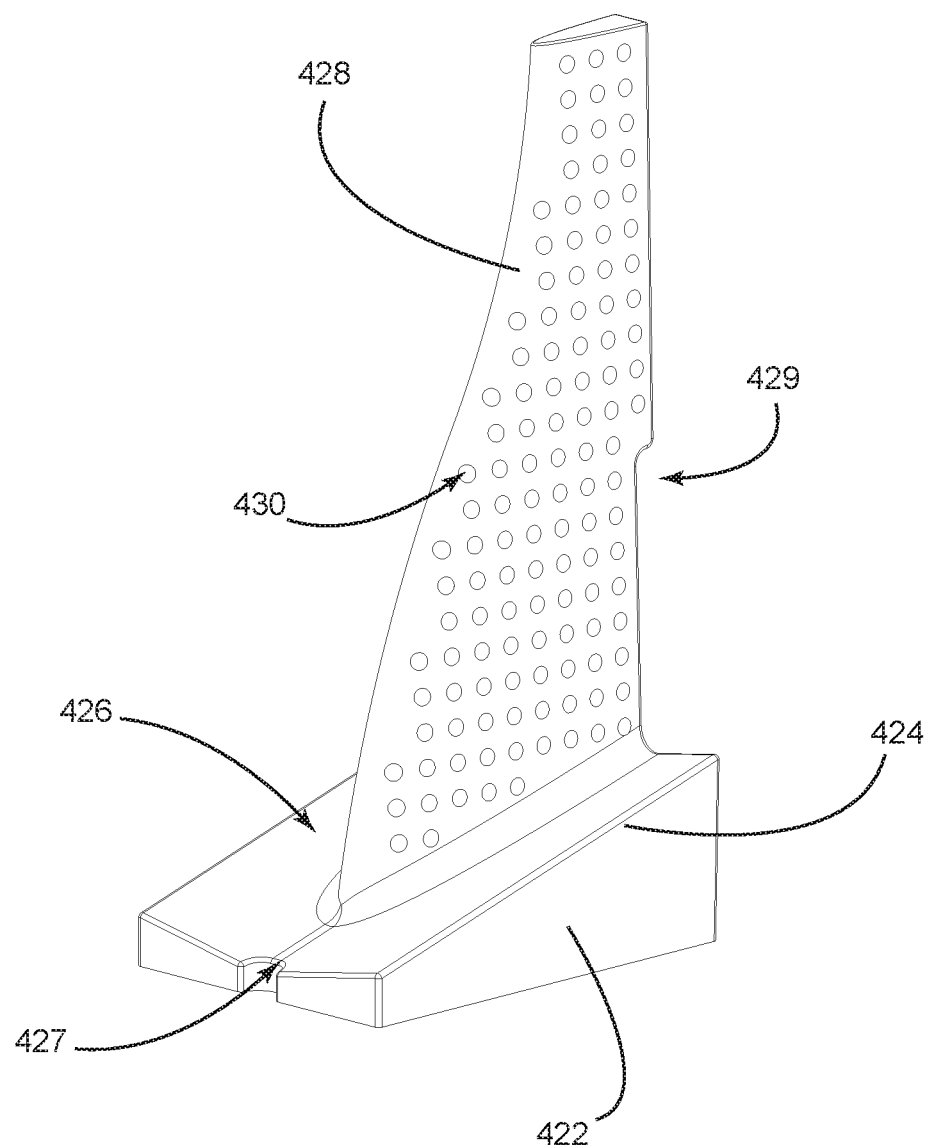
FIG. 9 is a perspective view of another embodiment of a perforated, vertical gill and slanted base.

FIG. 9, in an example embodiment 420, a perforated, vertical gill and horizontal, slanted base comprised of a base 422, a sloped false bottom 424, a solid bottom surface 426, a front base indent 427, a rear contour 429, a protrusion or gill 428, and gill perforations 430 are shown. The gill has a forward edge that is S-shaped.

Figure 10:
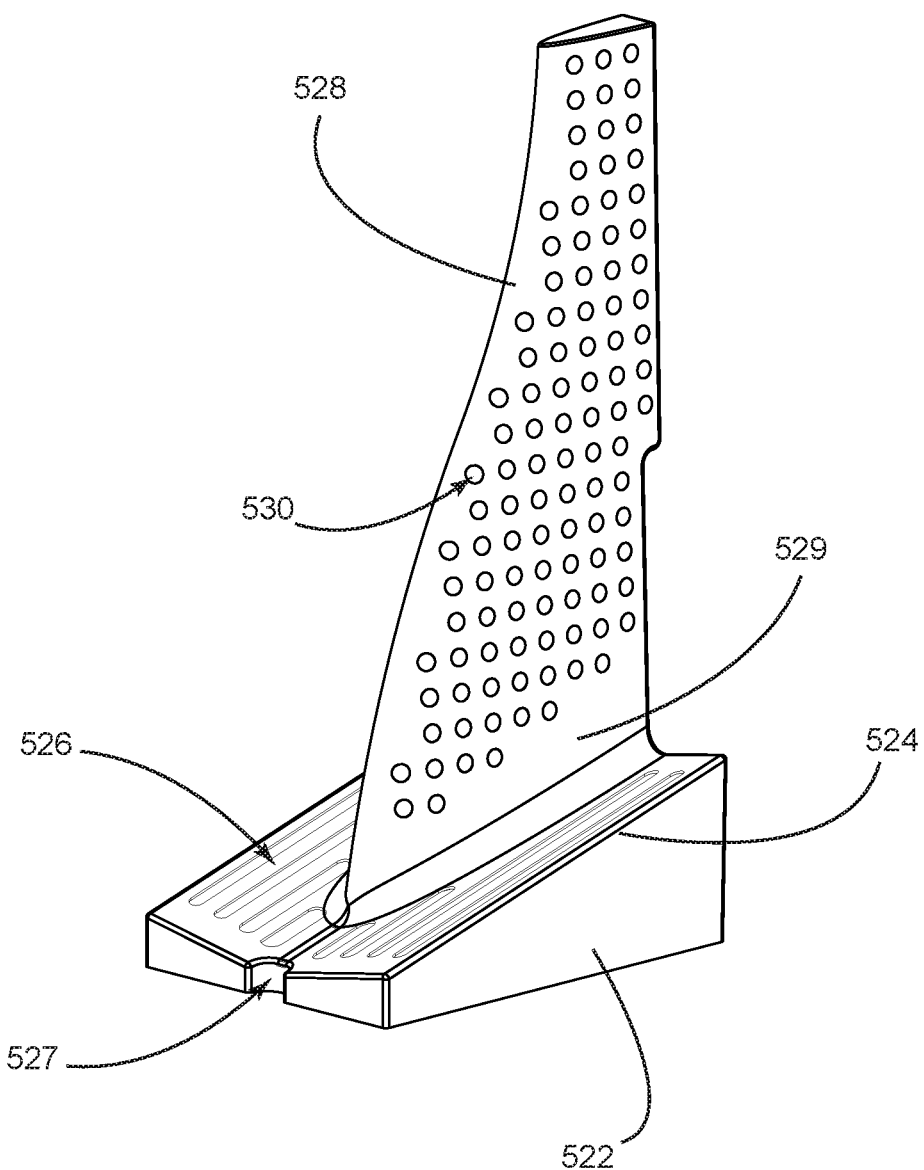
FIG. 10 is a perspective view of another embodiment of a perforated, vertical gill and slanted base.

FIG. 10, in an example embodiment 520, a perforated, vertical gill and horizontal, slanted base comprised of a base 522, a sloped false bottom 524, a grooved bottom surface 526, a front base indent 527, a protrusion or gill 528, and gill perforations 530 are shown.

Figure 11:
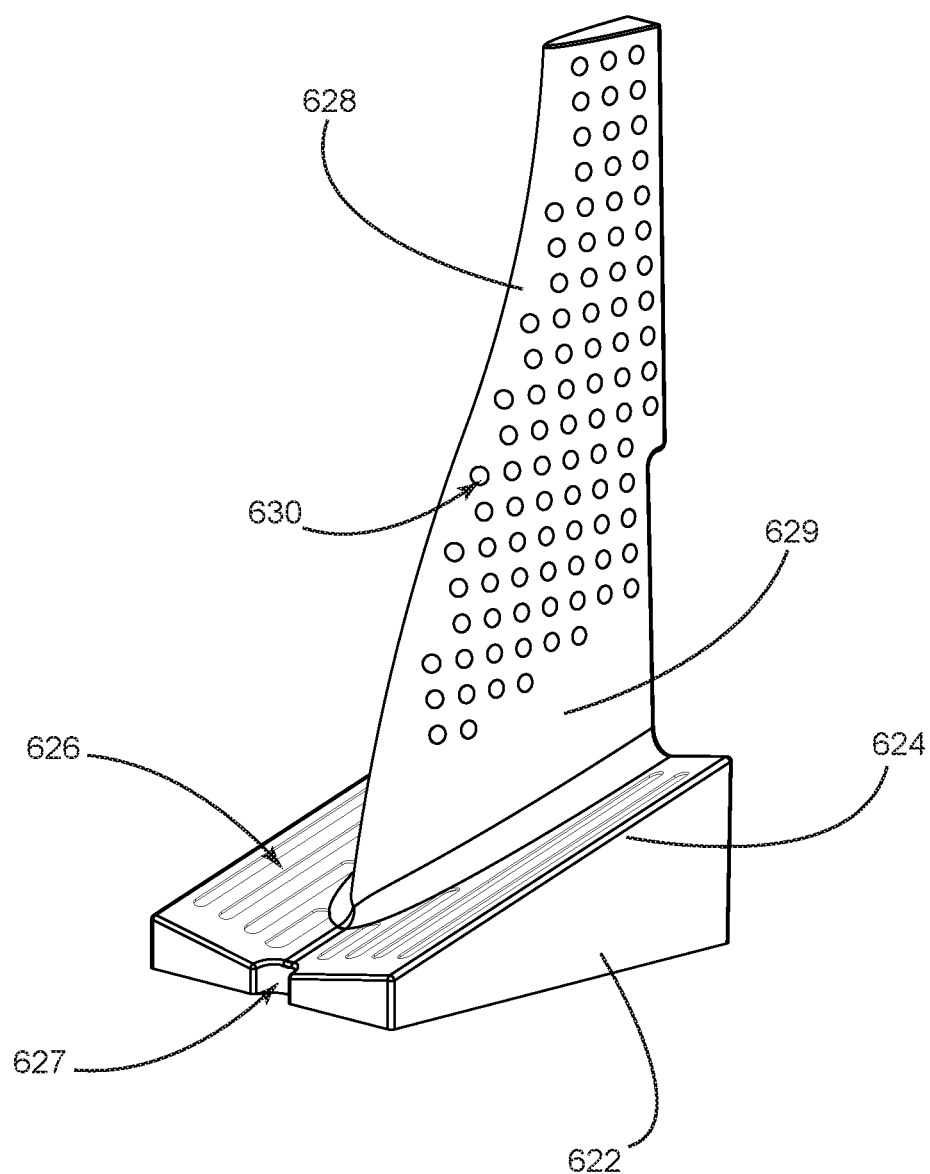
FIG. 11 is a perspective view of another embodiment of a perforated, vertical gill and slanted base.

FIG. 11, in an example embodiment 600, a perforated, vertical gill and horizontal, slanted base comprised of a base 622, a sloped false bottom 624, a grooved bottom surface 626, a front base indent 627, a protrusion or gill 628, and gill perforations 630 are shown. Gill perforations 630 cover the upper portion of the gill and are not present in the lower portion of the gill.

Figure 12:
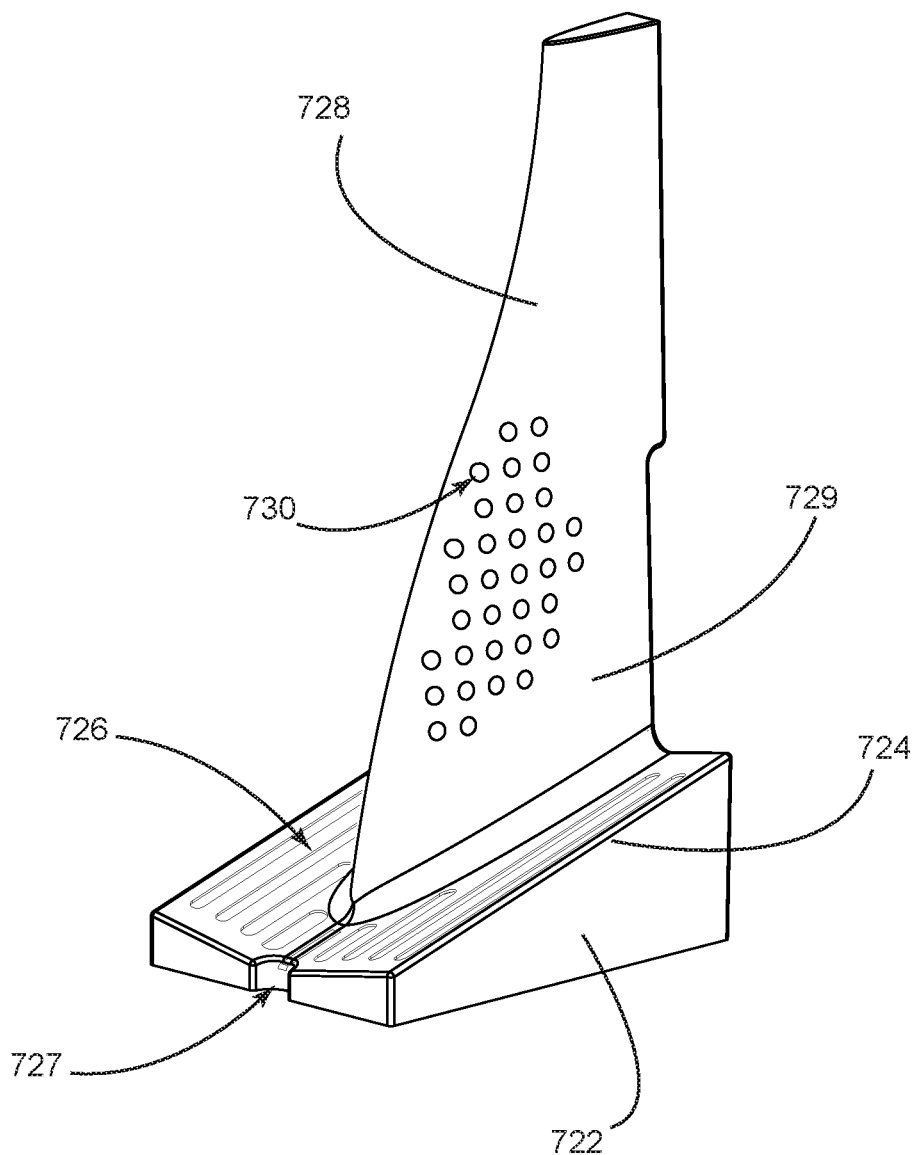
FIG. 12 is a perspective view of another embodiment of a perforated, vertical gill and slanted base.

FIG. 12, in an example embodiment 720, a perforated, vertical gill and horizontal, slanted base comprised of a base 722, a sloped false bottom 724, a grooved bottom surface 726, a front base indent 727, a protrusion or gill 728, a solid gill area 729, and gill perforations 730 are shown. Gill perforations are present only in the forward portion of the lower S-curve.

Figure 13:
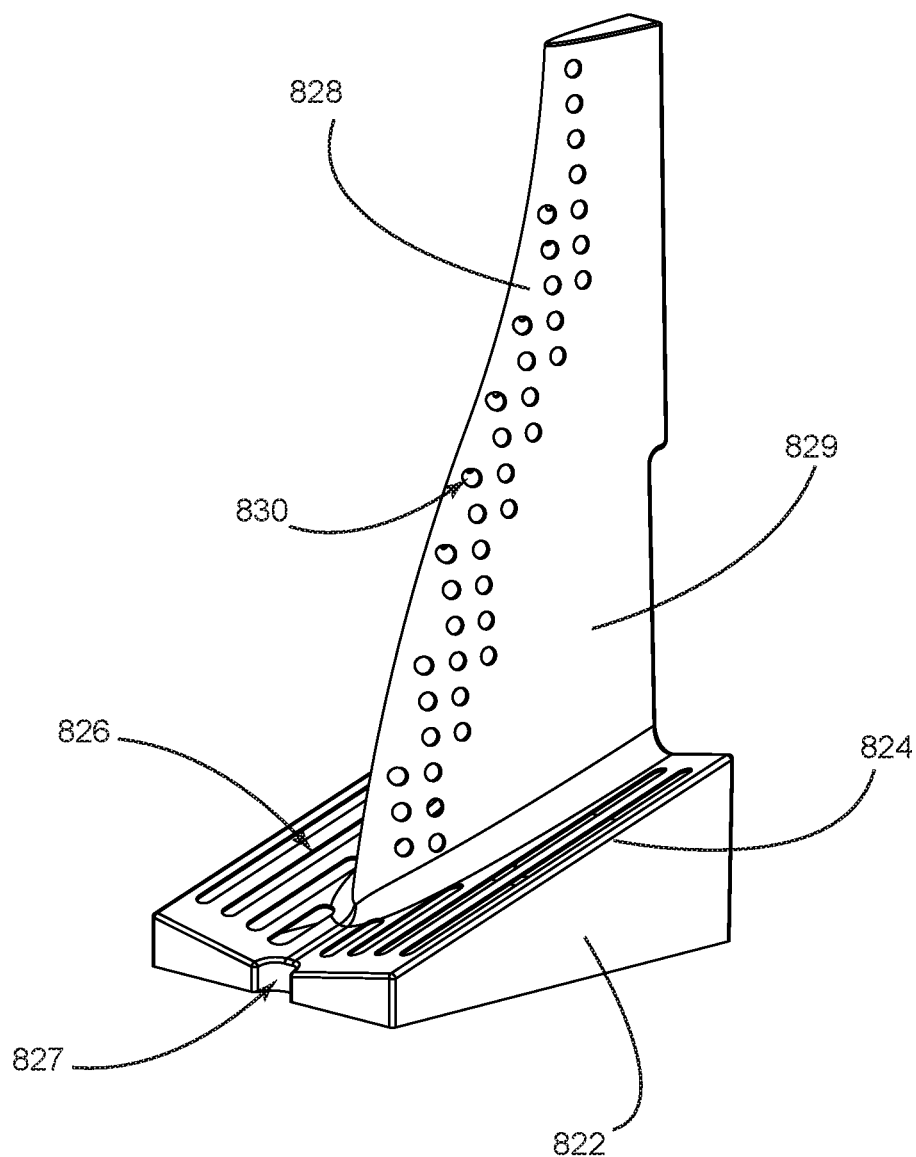
FIG. 13 is a perspective view of one embodiment of a perforated, vertical gill and slanted base.

FIG. 13, in an example embodiment 820, a perforated, vertical gill and horizontal, slanted base comprised of a base 822, a sloped false bottom 824, a grooved bottom surface 826, a front base indent 827, a protrusion or gill 828, a solid gill area 829, and gill perforations 830 are shown. Perforations 830 are located proximal to the forward S-curved edge.

Figure 14:
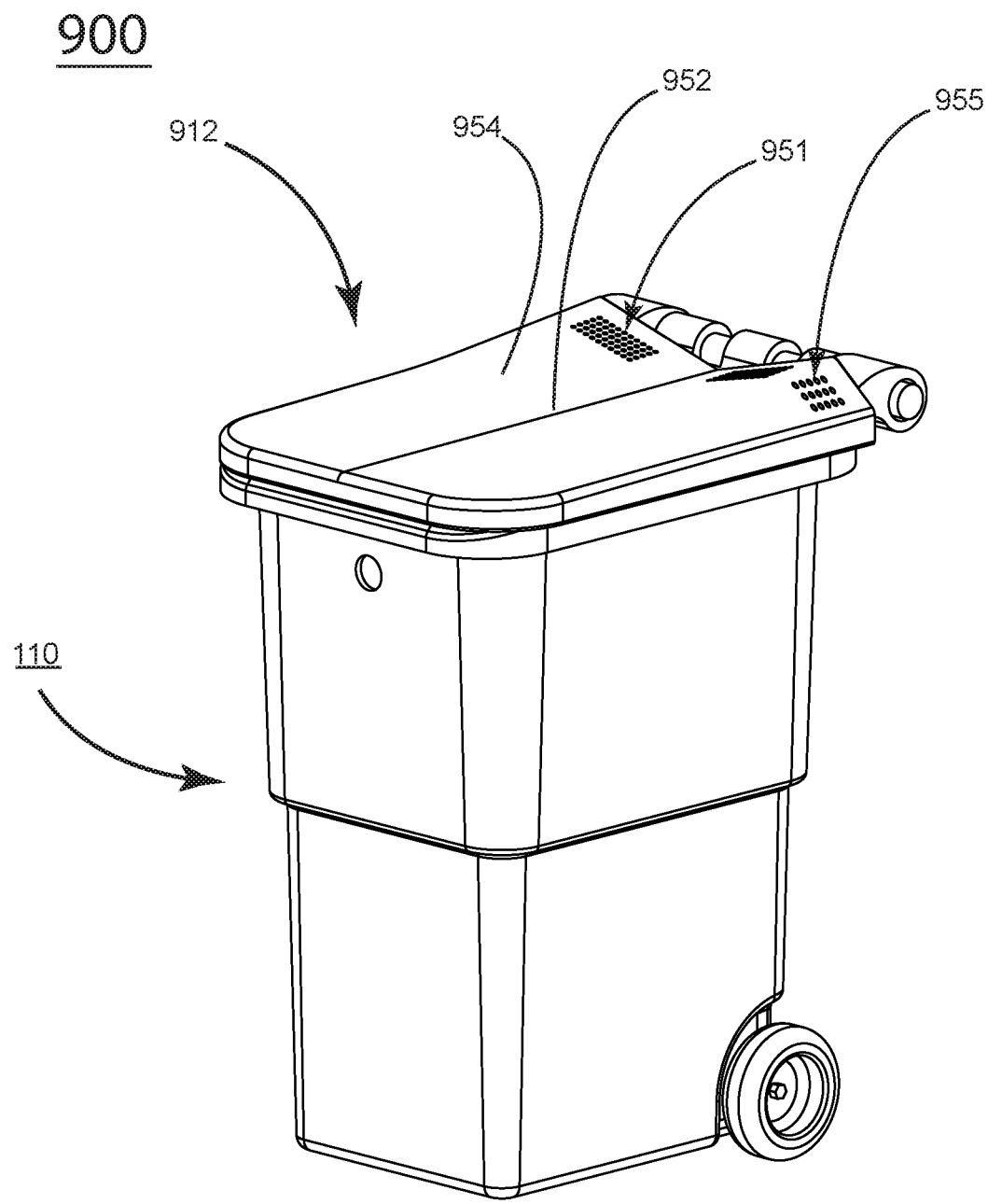
FIG. 14 is a perspective view of the earth appliance aerated composter unit.

FIG. 14 is a perspective view of the embodiment 900 comprised of a municipal recycling tote 110 and lid 912 comprised of a slanted lid top surface 954 and center crease 952, having side vents 955 and top vents 951.

Figure 15:
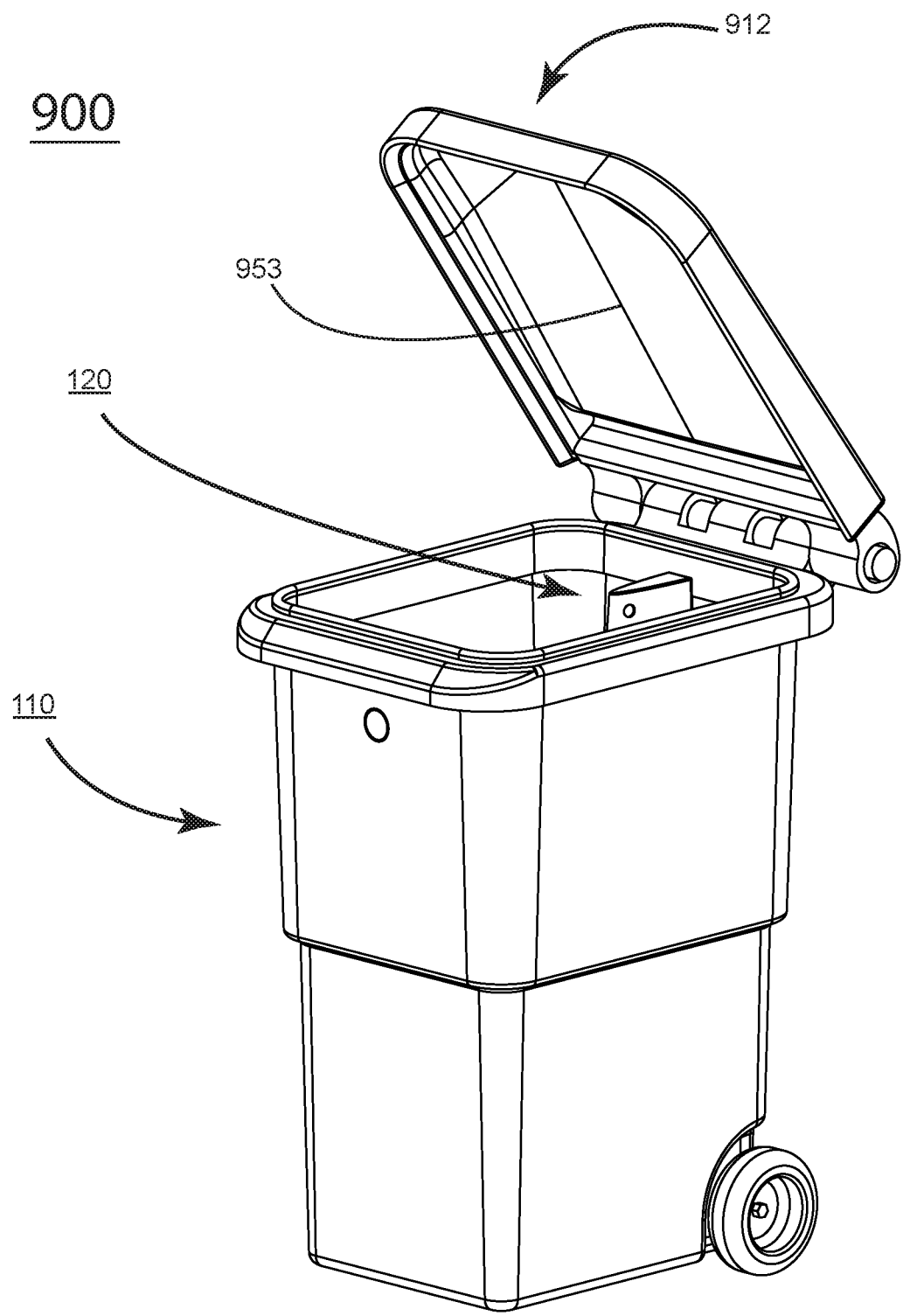
FIG. 15 is another perspective view of the earth appliance aerated composter unit.
Figure 16:
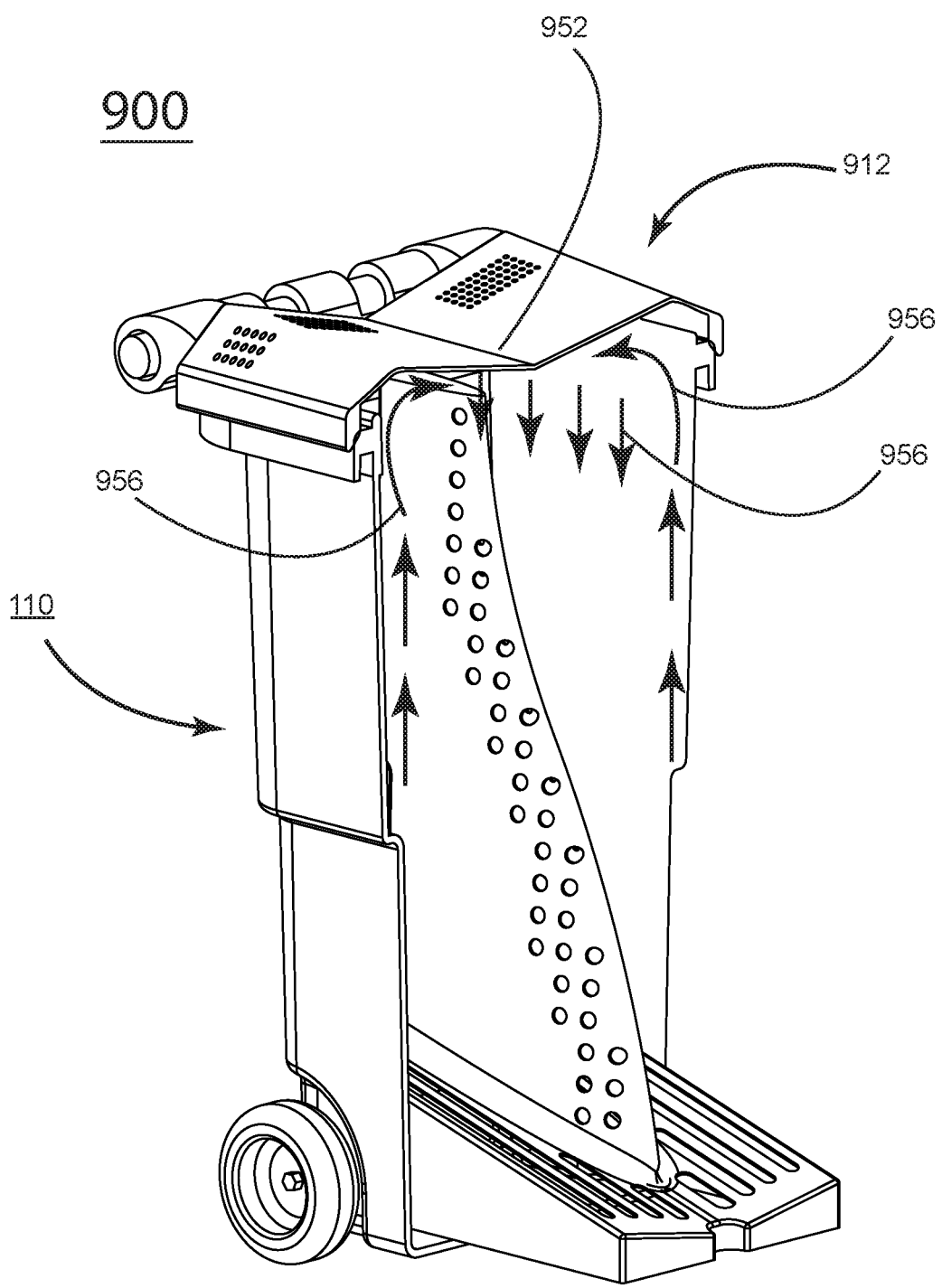
FIG. 16 is a perspective, section view of the earth appliance aerated composter unit.

FIG. 15 is a perspective view of the embodiment 900 and FIG. 16 is a perspective section view of the embodiment 900 comprising a municipal recycling tote 110 and lid 912 comprised of a slanted lid bottom surface and center crease 953. When the lid 912 is closed, the center crease 952 is proximal to the gill 120. The purpose of the center crease and slanted lid is to direct condensate toward the center crease. As water vapor rises through the compost material, it condenses on the undersurface of the lid 912 and moves along the slanted top, toward the center crease 953. As condensate 956 rises out of the compost material and gathers on the underside of the slanted lid surface 954, it falls toward the center crease 952, and falls from the center crease 952 in the region closest to the gill 120. The compost material closest to the gill is likely the driest material as the gill has caused aeration in that area.

Figure 17:
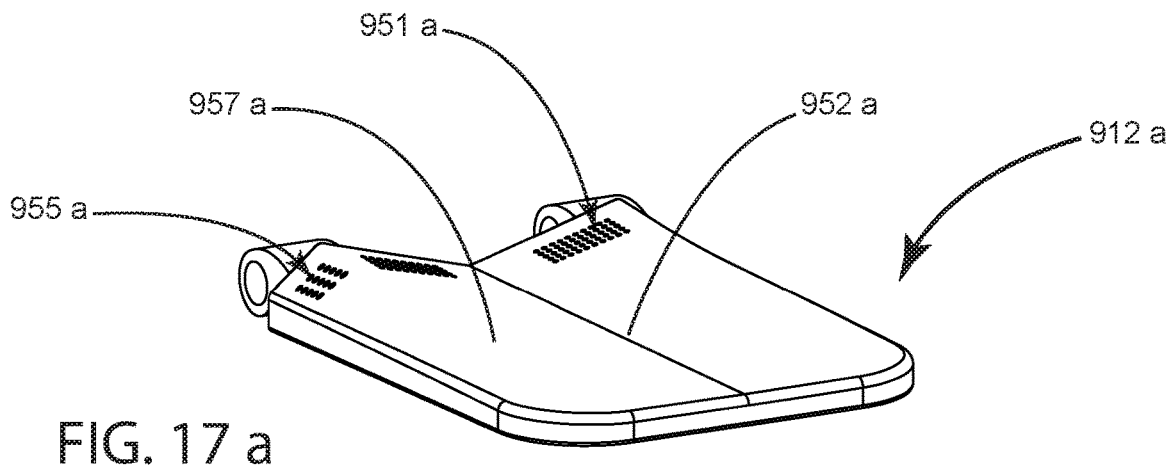
FIGS. 17a, b, and c are perspective views of the angled-surface lid.
Figure 17:
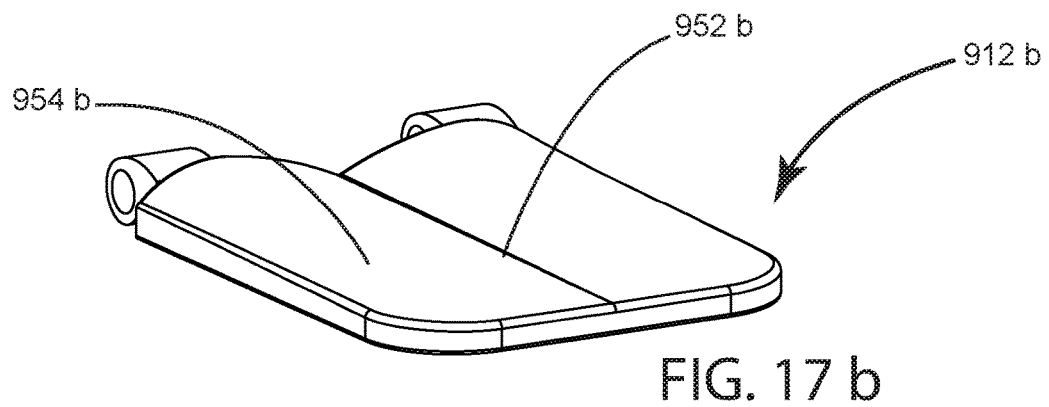
Figure 17:
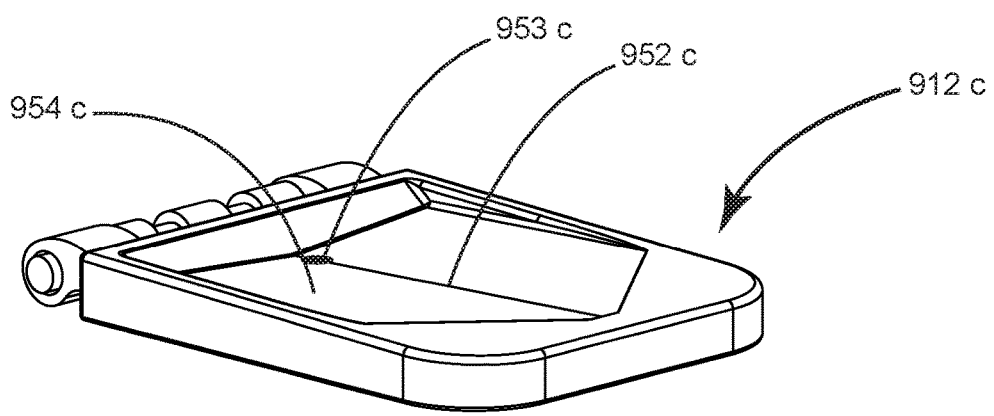

FIGS. 17a, b and c, illustrate example embodiments of an angled surface lid 912a, b and c, comprised of upward vents 951a, a center crease 952a, b and c, a drain 953c, an angled surface 954a, and c; an angled-curved surface 952b and side vents 955a. One skilled in the art understands that although one crease is shown for directing condensate along one line, multiple creases may also be used to cause condensate to drip in other regions.

Figure 18:
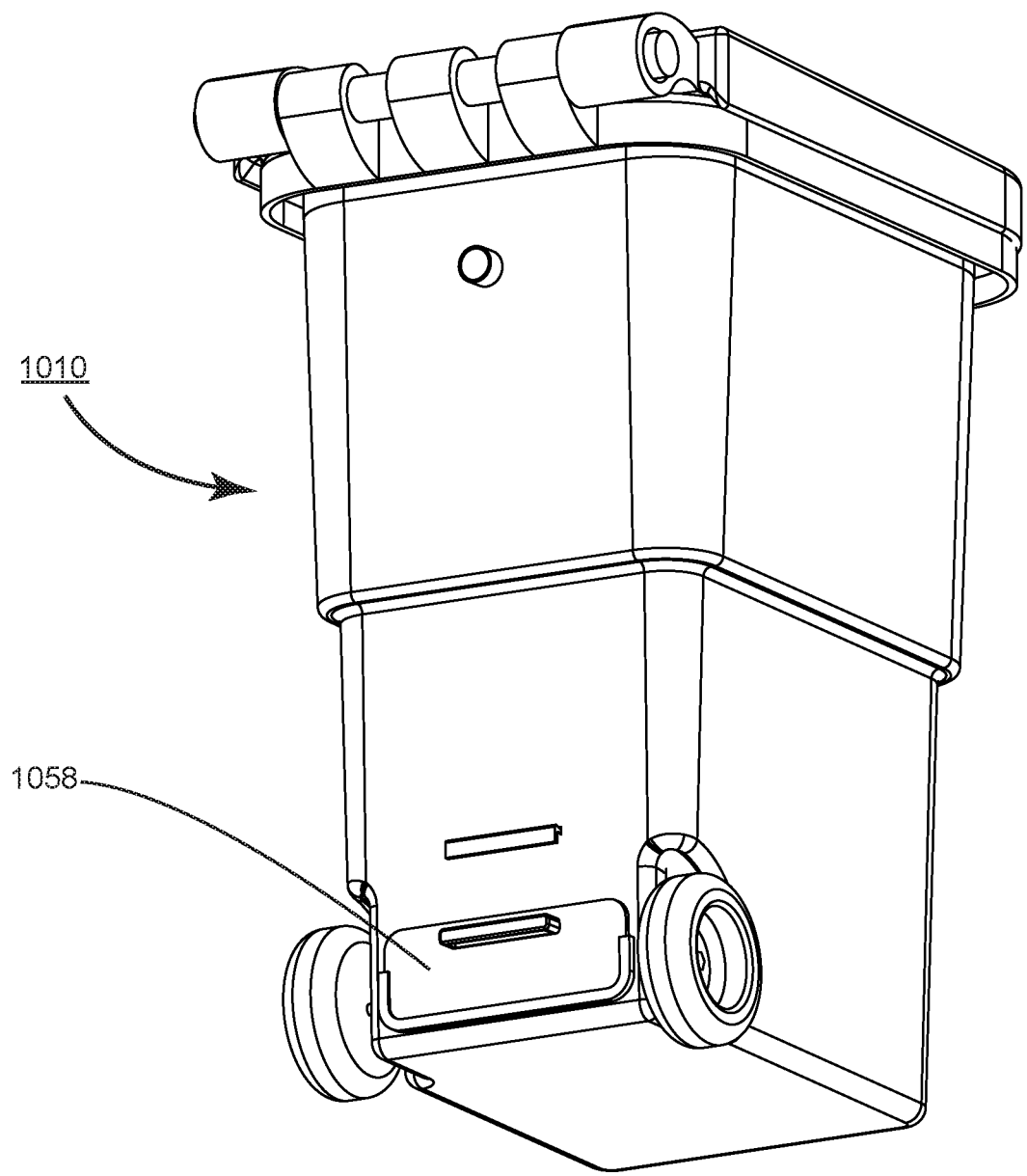
FIG. 18 is a perspective view of one embodiment of the earth appliance aerated composter unit.

FIG. 18 is perspective, rear view of the embodiment 1000 comprised of a municipal recycling tote 1010 and access gate 1058. The access gate 1058 allows the user to collect compost from the bottom of the container.

Figure 19:
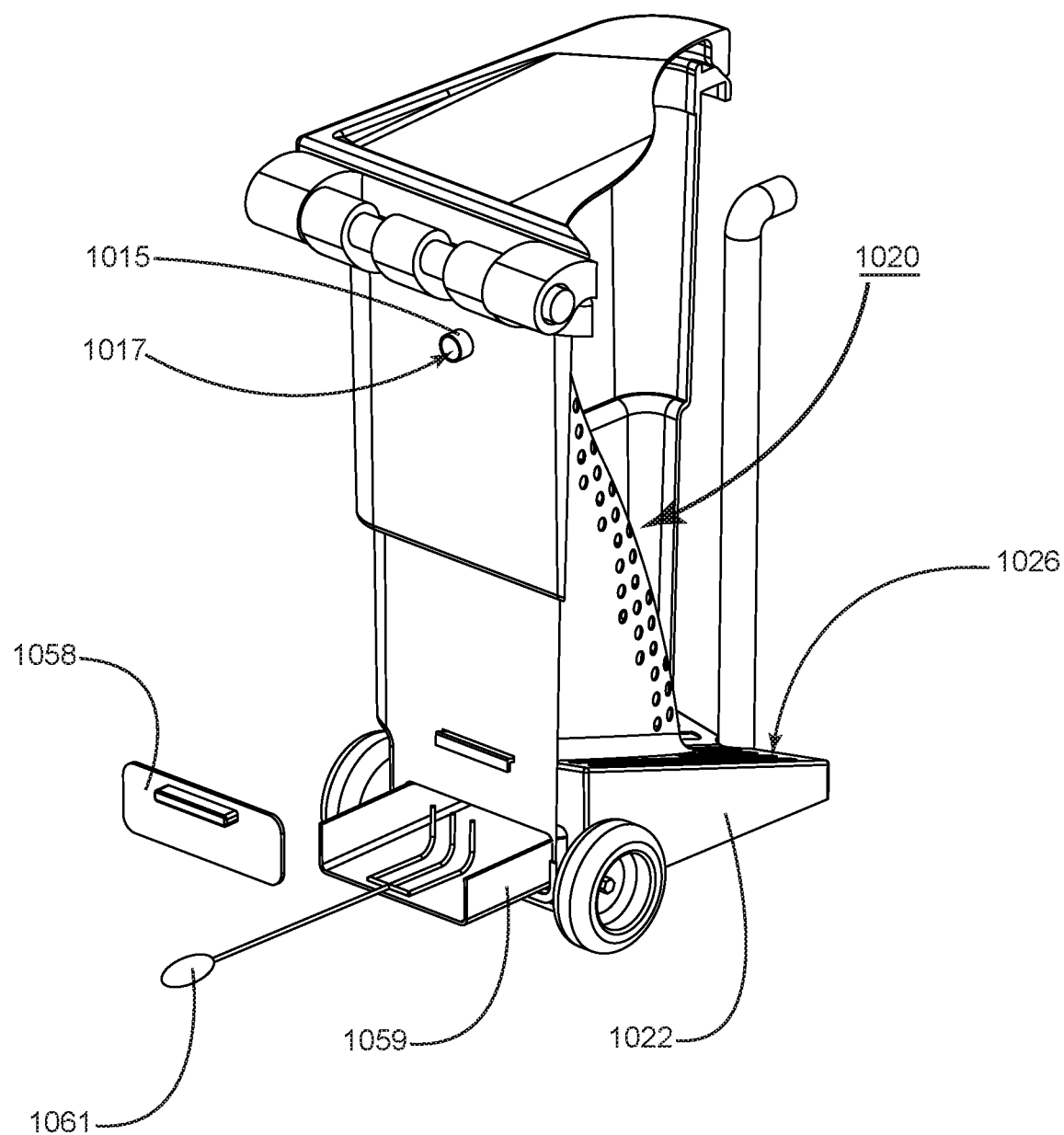
FIG. 19 is a perspective, section view of another embodiment of the earth appliance aerated composter unit.

FIG. 19 is a perspective, section view of the embodiment 1000, comprising a rear outlet vent pipe 1015, an outlet vent 1017, a protrusion or gill 1020, a sloped false bottom 1022, an access gate 1058, and a harvesting drawer 1059. Grooves 1026 in the sloped false bottom 1022 allow the user to employ a tool such as a rake 1061, to move the compost material into the harvesting drawer 1059. One skilled in the art understands that a rake may be used as well as a guided, sliding set of tines or a rotating set of tines or any number of means for moving granular material through a grate or other barrier.

Figure 20:
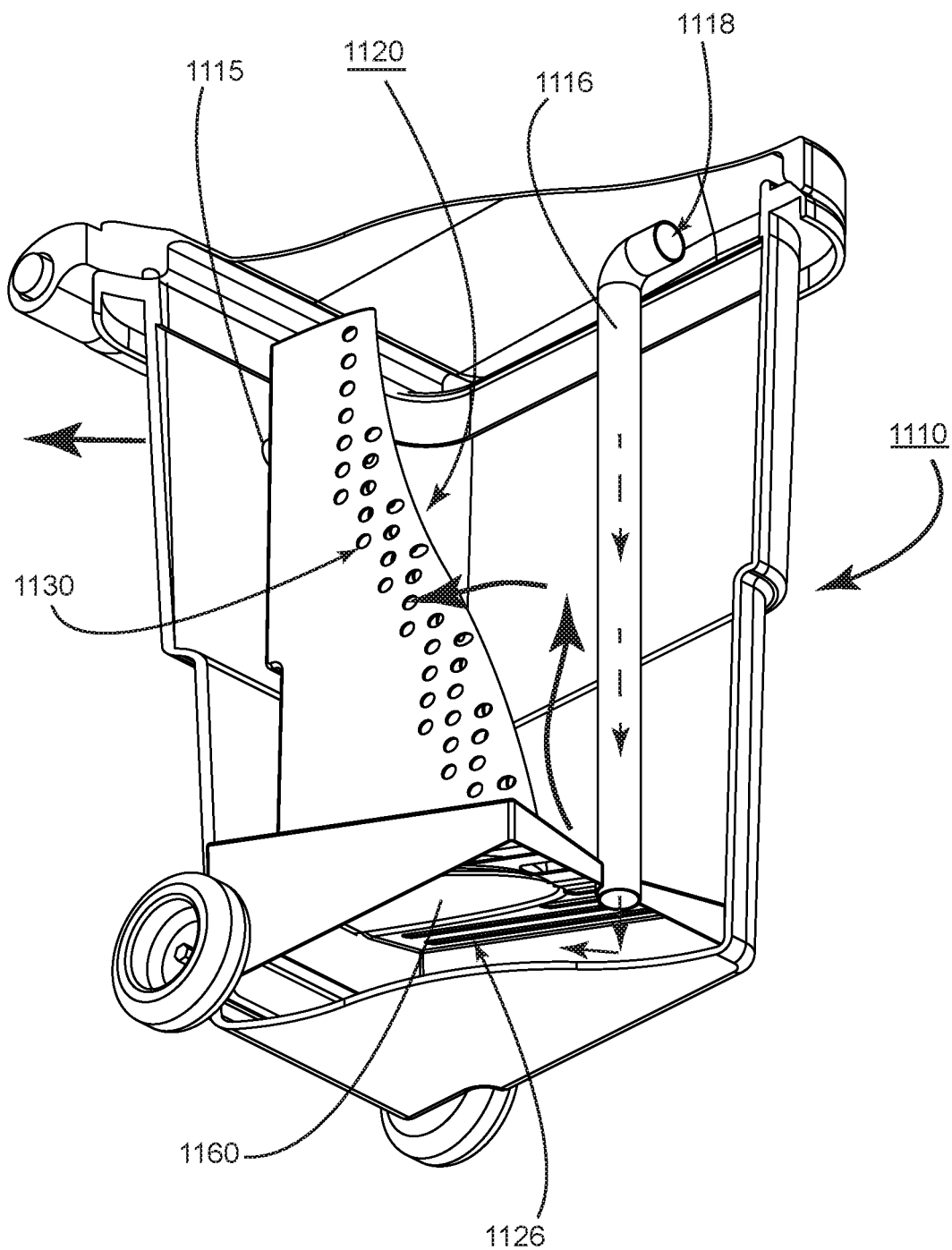
FIG. 20 is a perspective, section view of another embodiment of the earth appliance aerated composter unit.

FIG. 20 is a perspective section view of the embodiment 1100 comprised of a municipal recycling tote 1110, an outlet vent pipe 1115, an inlet vent pipe 1116, an inlet vent 1118, a gill 1120, a sloped and grooved false bottom 1126, gill perforations 1130, and a gill cover 1160. The gill cover 1160 prevents flow from the vent 1118 from flowing into the gill and instead, air from the vent 1118 flows into the interior of the sloped false bottom, through the grooves in the sloped false bottom, through the compost material, through the perforations 1130 in the gill 1120 and out the rear conduit 1115 and out the rear vent (as illustrated by 1017 in FIG. 19, embodiment 1000).

Figure 21:
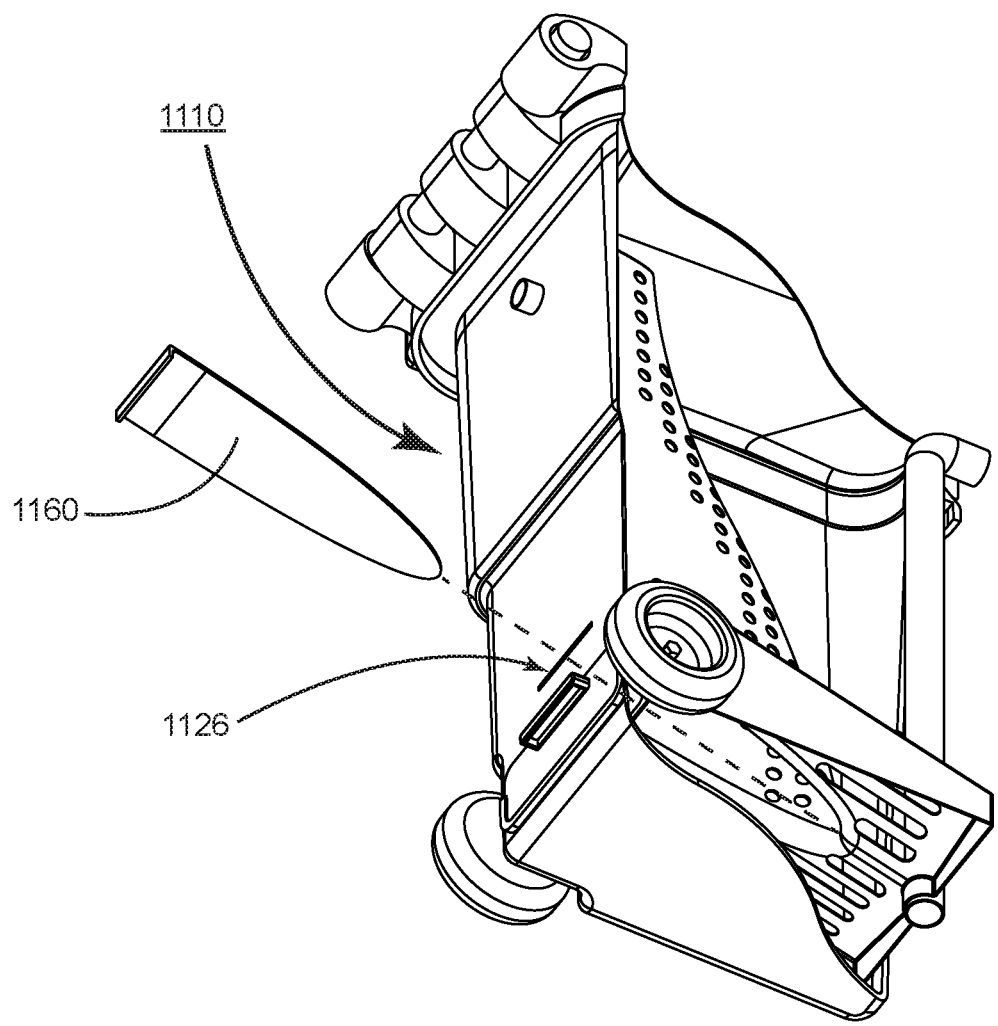
FIG. 21 is a perspective, section view of another embodiment of the earth appliance aerated composter unit.

FIG. 21 is a perspective, section, bottom view of the embodiment 1100 comprised of a municipal recycling tote 1110, a gill bottom opening cover insertion slot 1160, and a gill cover 1160. The illustration depicts a sliding manner in which the gill cover 1160 may be removed.

Figure 22:
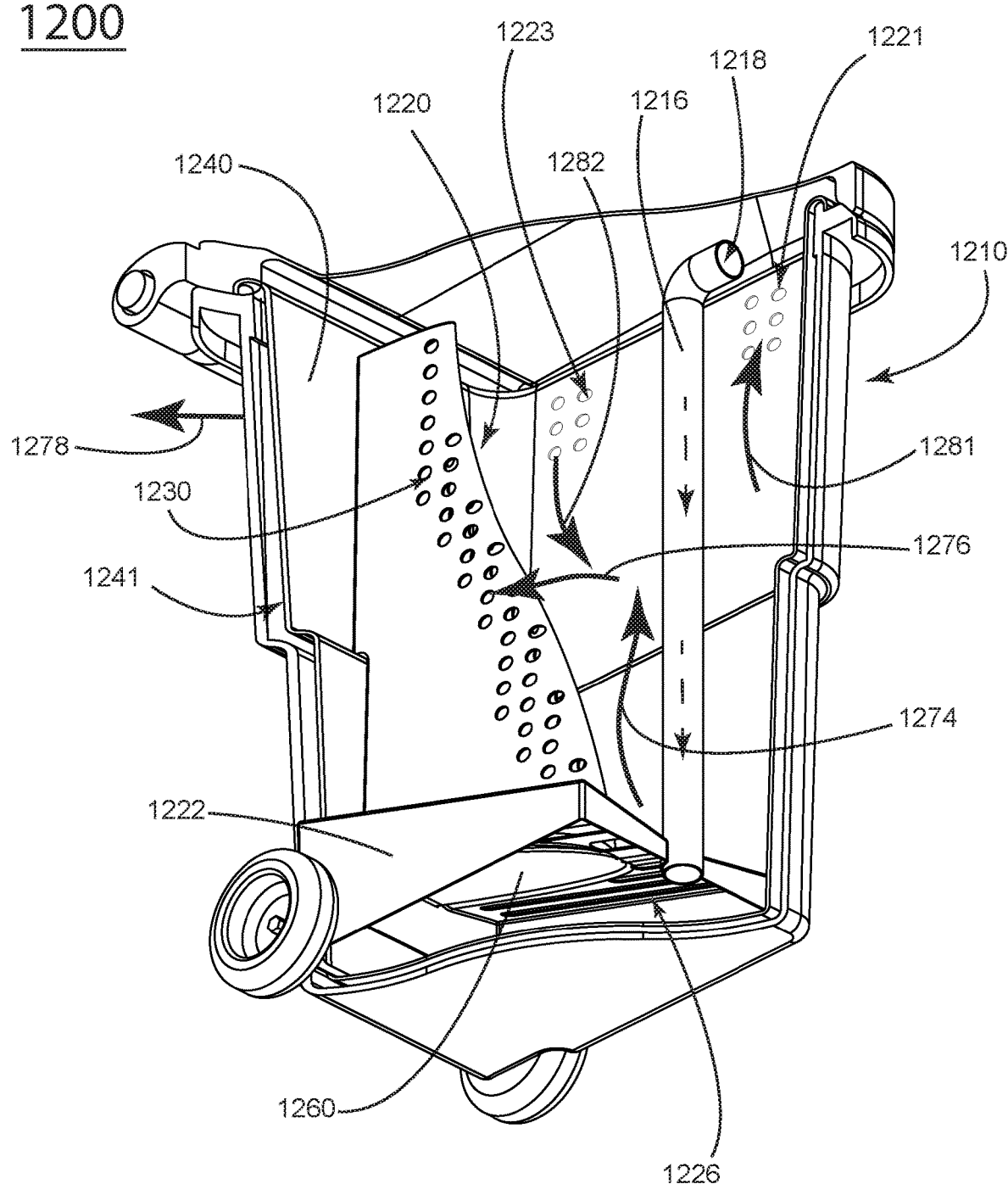
FIG. 22 is a perspective, section view of another embodiment of the earth appliance aerated composter unit.
Figure 23:
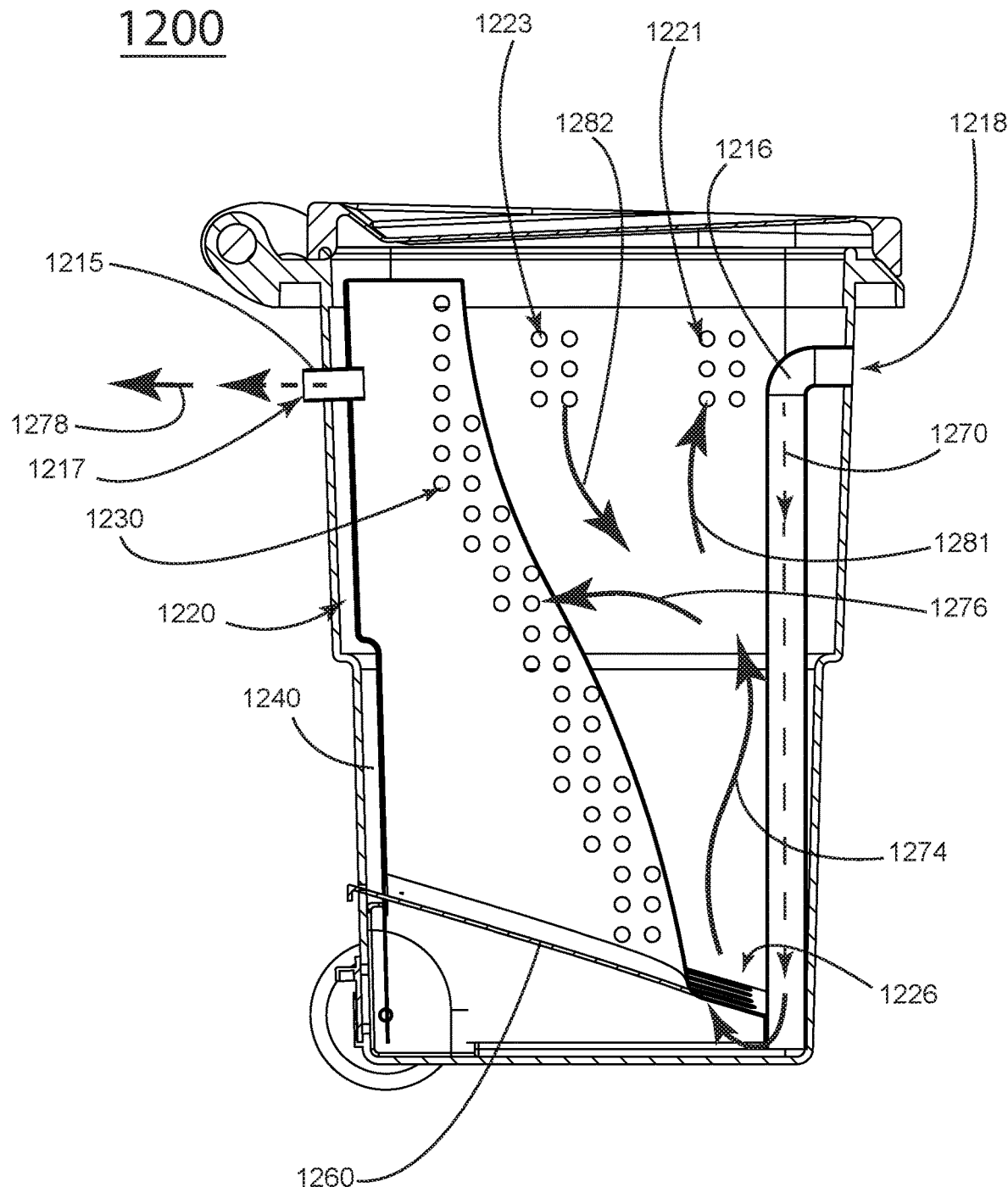
FIG. 23 is an orthographic, section view of another embodiment of the earth appliance aerated composter unit.

FIG. 22 is a perspective section view of embodiment 1200; FIG. 23 is an orthographic, section view of the embodiment 1200, illustrating the flow of air through one embodiment. Vents allow air flowing through an inlet vent 1218 through the conduit 1216 and subsequently through grooves 1226 in the sloped false bottom 1260, and through the compost in the container as shown by arrow 1274. The air then flows through the compost in the container and some flows in or out through vents 1221, as illustrated by arrow 1281; while some of the air flowing through the compost will flow in or out of vent holes 1223 and into the plenum 1241 that resides between the liner 1240 and the container 1210. Additionally, air flowing through the compost may flow through gill vents 1230 as shown by arrow 1276, and out through a rear conduit 1215 and out rear vent 1217 as shown by arrows 1278.

Figure 24:
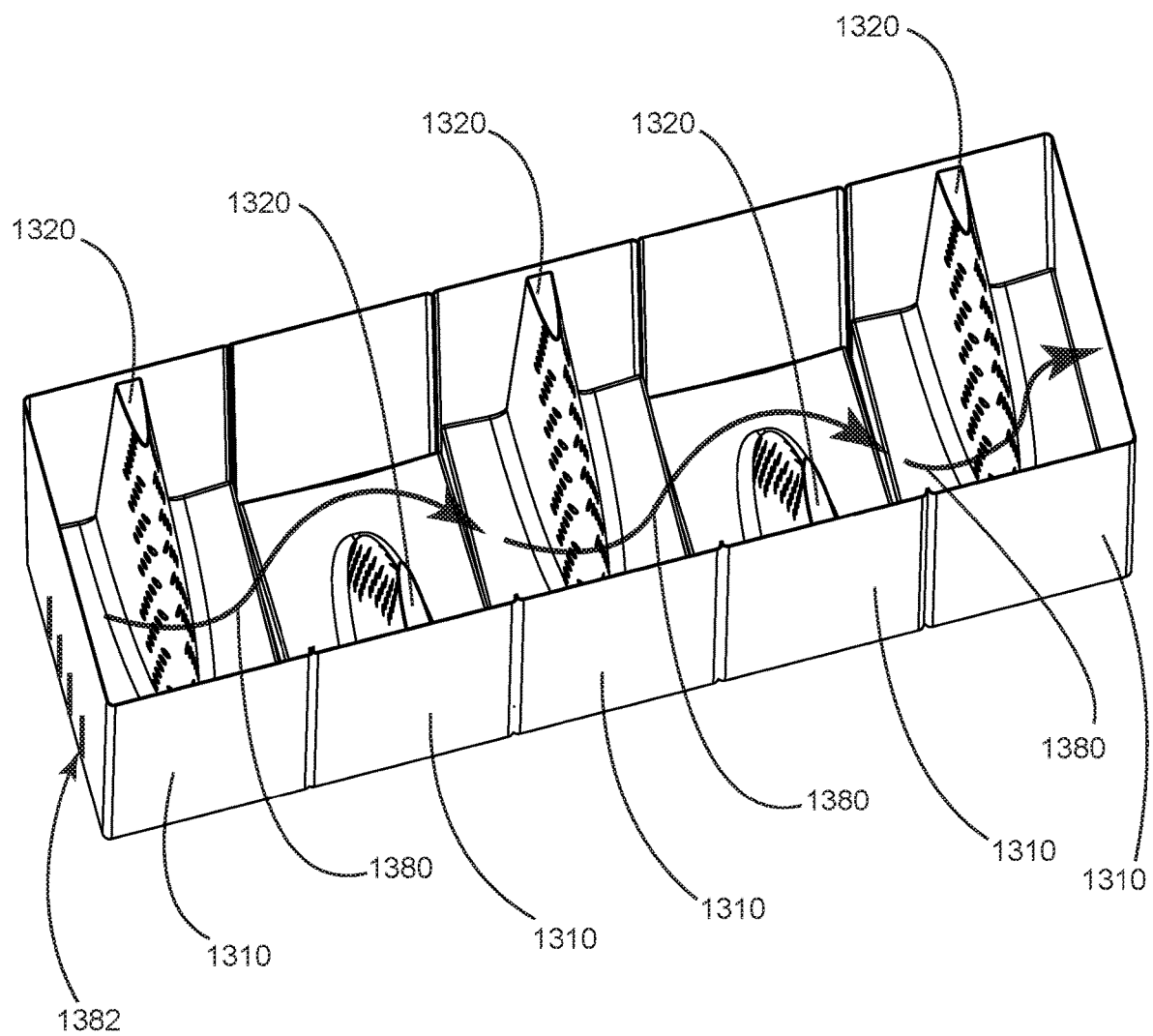
FIG. 24 is a perspective view of another embodiment of the earth appliance aerated composter unit with multiple gills arrayed in a linear pattern.
Figure 25:
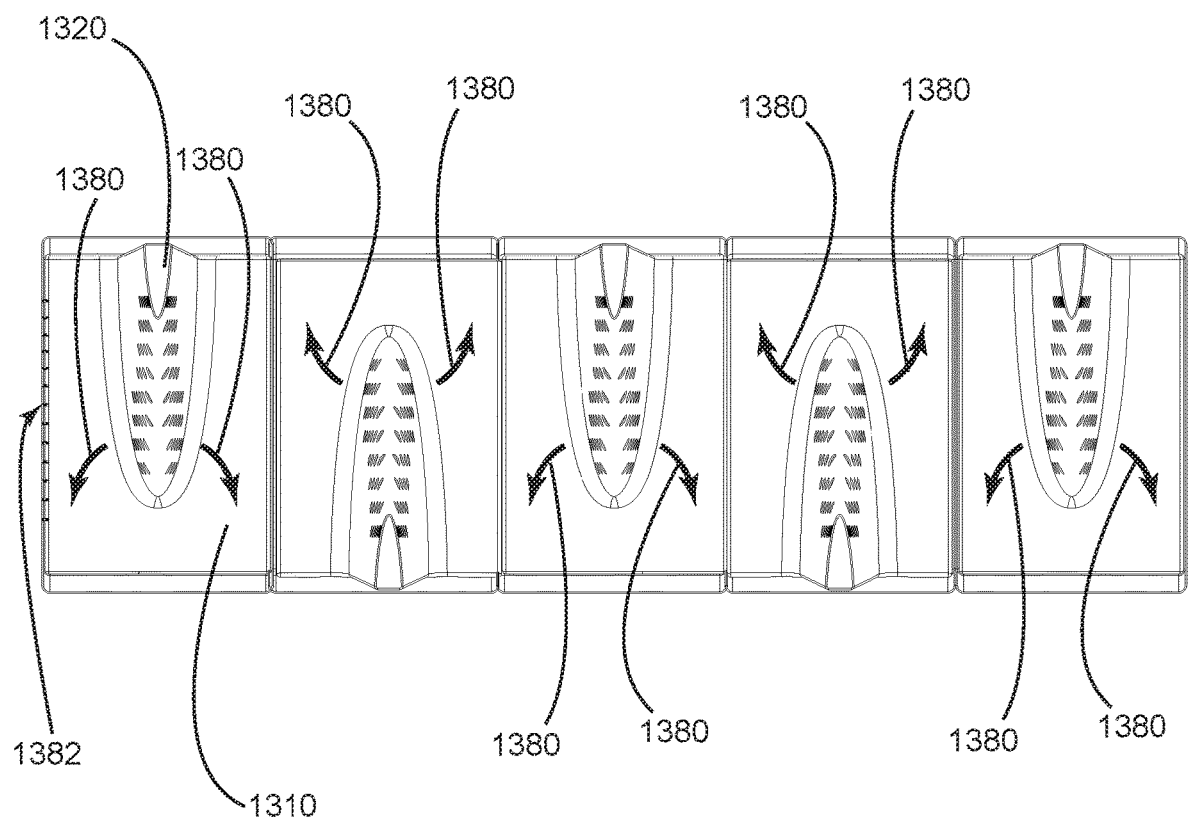
FIG. 25 is an orthographic, top view of the embodiment of the earth appliance aerated composter unit of FIG. 24.

FIG. 24 is a perspective section view of the embodiment 1300; FIG. 25 is an orthographic, top view of the embodiment 1300. Containers 1310 may be used individually or ganged together as shown. One skilled in the art understands that the array of containers may be divided into a number of individual containers. Each container contains a gill 1320. Airflow, illustrated by arrows 1380, flows around and through the array of gills 1320. One or more of the containers 1310 may contain vents 1382.

Figure 26:
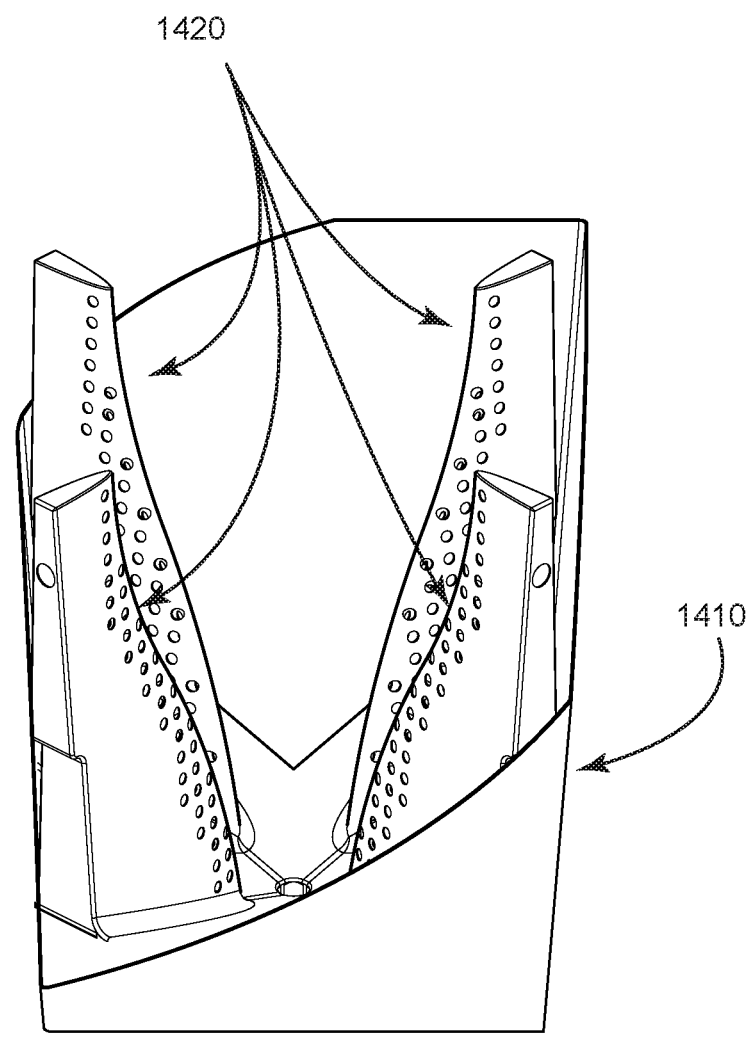
FIG. 26 is a perspective view of another embodiment of the earth appliance aerated composter unit with multiple gills arrayed in a radial pattern.
Figure 27:
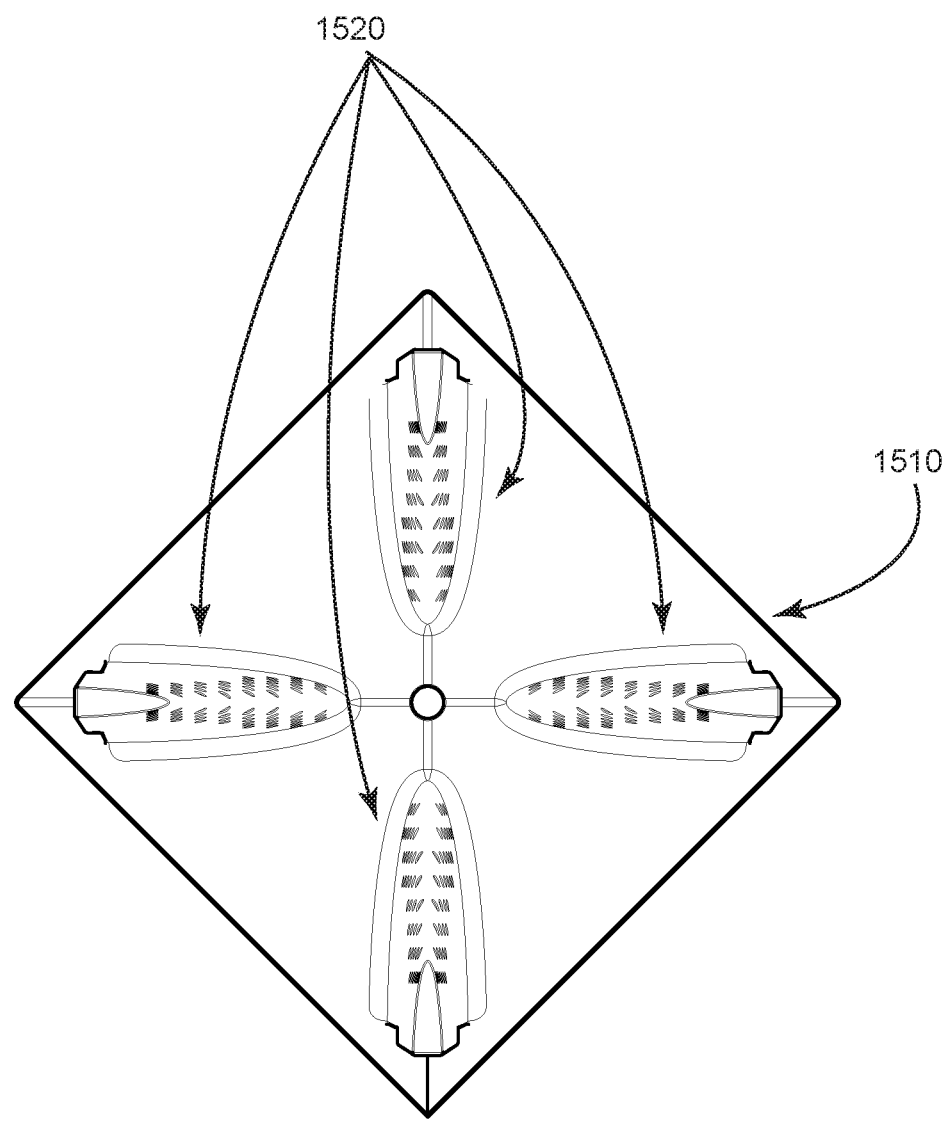
FIG. 27 is an orthographic, top view of the embodiment of the earth appliance aerated composter unit of FIG. 26.

FIG. 26 is a perspective section view of the embodiment 1400; FIG. 27 is an orthographic, top view of the embodiment 1400. A container 1410 contains a series of gills 1420 arranged in a radial pattern within the container 1410.

One skilled in the art understands that variations of the aforementioned embodiments may be combined in novel ways not specifically illustrated here. For example, some of the aforementioned embodiments have vent inlets and outlets adapted to provide anaerobic digestion when the container is sufficiently filled with water, gas may be extracted out of the aforementioned lid vent.

The invention claimed is:

1. An apparatus for controlling the aeration and moisture content of compost comprising:
a container for holding compost; and
at least one hollow gill; and
a conduit that extends from the inside of the at least one hollow gill to the outside of the container; and
a lid; and
the at least one hollow gill residing inside the container; and
the container having vertical walls, a bottom and an open top; and
the lid removably engaged with the open top of the container; and
the at least one hollow gill having a top and bottom, a front edge, a rear surface, a left surface and a right surface; and
the at least one hollow gill bottom residing proximal to the container bottom; and
the at least one hollow gill being larger at the bottom than at the top, tapering from bottom to top; and
the left surface and right surface of the at least one hollow gill being perforated; and
the interior of the at least one hollow gill being vented to the ambient environment outside of the container; wherein
ambient air from outside of the container may flow through the at least one gill and into the compost preventing the buildup of excessive moisture in the compost.

2. The apparatus for controlling the aeration and moisture content of compost of claim one, wherein the at least one hollow gill tapers in a stepped configuration.

3. The apparatus for controlling the aeration and moisture content of compost of claim one, wherein the at least one hollow gill has a rear-surface that is substantially vertical.

4. The apparatus for controlling the aeration and moisture content of compost of claim one, wherein the at least one hollow gill is open at the top.

5. The apparatus for controlling the aeration and moisture content of compost of claim one, wherein the container is double walled.

6. The apparatus for controlling the aeration and moisture content of compost of claim one, wherein the lid is double walled.

7. The apparatus for controlling the aeration and moisture content of compost of claim one, wherein the container is double walled, the inner of the double walled surface being perforated.

8. An apparatus for controlling the aeration and moisture content of compost comprising:
a container for holding compost; and
at least one hollow gill; and
a conduit that extends from the inside of the at least one hollow gill proximal to the front edge and proximal to the bottom of the at least one hollow gill, to the outside of the container at a location that is above the bottom of the container, a distance that is between 40% and 60% of the height of the container; and
a second conduit extending from the inside of the at least one hollow gill proximal to the gill, rear-surface and extending out of the container at a location that is above the bottom of the container, a distance that is between 30% and 50% of the height of the container; and
a lid; and
the at least one hollow gill residing inside the container; and
the container having vertical walls, a bottom and an open top; and
the lid removably engaged with the open top of the container; and
the at least one hollow gill having a top and bottom, a front edge, a rear surface, a left surface and a right surface; and
the hollow gill bottom residing proximal to the container bottom; and
the at least one hollow gill being larger at the bottom than at the top, tapering from bottom to top; and
the left surface and right surface of the at least one gill being perforated; and
the interior of at least one hollow gill being vented to the ambient environment outside of the container; wherein
ambient air from outside of the container may flow through the at least one gill and into the compost preventing the buildup of excessive moisture in the compost.

9. An apparatus for controlling the aeration and moisture content of compost comprising:
a container for containing compost; and
at least one hollow gill; and
a lid; and
the at least one hollow gill residing inside the container; and
the container having vertical walls, a bottom and an open top; and
the lid removably engaged with the open top of the container; and
the at least one hollow gill having a gill top and a gill bottom, a gill front edge, a gill rear surface, a gill left surface and a gill right surface; and
the gill left surface and gill right surface of the at least one hollow gill meeting at the gill front edge of the at least one hollow gill; and
the at least one hollow gill being larger at the gill bottom than at the gill top, tapering from gill bottom to gill top; and
the lid having a lid front surface, a lid rear surface, a lid left side surface and a lid right side surface, a lid flat bottom and a lid sloped top; and
the lid sloped top having an upper surface and an under surface; and
the lid sloped top having long central plane about which the lid left surface and lid right surface are symmetrical; and
the top edge of the lid right surface and the top edge of the lid left surface each defining the edge of a plane that meets at a lid sloped edge that resides along said central plane forming a crease; wherein
the top of the lid slopes from the top of the left surface toward the central plane and from the top of the right surface toward the central plane forming a crease, wherein moisture rising out of the compost in the container condensing about the bottom surface of the lid will drip down off the crease and into the compost along the region proximal to the gill front edge of the at least one hollow gill.

10. The apparatus of claim 9 wherein the lid comprises a damper for opening or closing a vent to control the amount of moisture condensing on the underside of the lid.

11. An apparatus for controlling the aeration and moisture content of compost comprising:
a container for containing compost; and
at least one hollow gill; and
at least one hollow base; and a lid; and the at least one hollow gill residing inside the container; and the container having vertical walls, a bottom and an open top; and the lid removably engaged with the open top of the container; and the at least one hollow gill having a gill top and a gill bottom, a gill front edge, a gill rear surface, a gill left surface and a gill right surface; and the gill left surface and gill right surface of the at least one hollow gill meeting at the gill front edge of the at least one hollow gill; and the at least one hollow gill being larger at the gill bottom than at the gill top, tapering from gill bottom to gill top; and the lid having a lid front surface, a lid rear surface, a lid left side surface and a lid right side surface, a lid flat bottom and a lid top; and the lid top having an upper surface and an under surface; and the lid top having long central plane about which the lid left surface and lid right surface are symmetrical; and the top edge of the lid right surface and the top edge of the lid left surface each defining the edge of the lid top that meets at a sloped edge that resides along said central plane; and the gill engaged with a base, the base having a base front surface, a base rear surface, a base left side surface and a base right side surface, a flat base bottom and a sloped base top; and the sloped base top having long central plane about which the left base surface and right base surface are symmetrical; and the top edge of the right base surface and the top edge of the left base surface each defining the edge of a plane that defines the sloped base top and meets at a sloped edge that resides along said central plane; and the sloped edge along the central plane is substantially parallel to the slope of the sloped base top; wherein the top of the lid slopes both from the rear surface toward the front surface and also slopes from the top of the left surface toward the central plane and from the top of the right surface toward the central plane wherein moisture rising out of the compost in the container condensing about the bottom surface of the lid will drip down into the compost along the region proximal to the front edge of the gill, while similarly moisture condensing about the inside of the hollow base will drip down in the center of the bottom of the hollow base.

12. The apparatus for controlling the aeration and moisture content of compost of claim 11 wherein at least two gills are arrayed in an alternating linear pattern with gill front edges facing toward a long axis that bisects the container.

13. The apparatus of claim 11 wherein the sloped base top is perforated.

14. The apparatus of claim 11 further comprising at least three gills arrayed in a radial pattern with gill front edges facing toward the center of the container.

15. The apparatus of claim 11 further comprising at least three gills and at least three lids having sloped top surfaces, the at least three gills and the at least three lids arrayed in a radial pattern with the at least three gills' front edges and lid front surfaces facing toward the center of the container.

16. The apparatus for controlling the aeration and moisture content of compost of claim 11 wherein the depth of the at least three gills are each between 10% and 60% of the inner depth of the municipal recycling tote and the depth of the at least three gills at the bottom are each between 40% and 100% of the inner depth of the a municipal recycling tote.

17. The apparatus for controlling the aeration and moisture content of compost of claim 11 wherein the container is filled with water to induce anaerobic digestion.

\* \* \* \* \*